United States Patent
Kaufman et al.

(10) Patent No.: US 8,542,816 B2
(45) Date of Patent: Sep. 24, 2013

(54) INDEPENDENT CUSTOMER SERVICE AGENTS

(75) Inventors: Donald L. Kaufman, Kirland, WA (US);
Adrian Inglis, Seattle, WA (US);
Thomas J. Weiland, Seattle, WA (US);
John E. Darrow, Shoreline, WA (US);
A. Lorraine Nicholson, Edmonds, WA (US); Jon R. Jay, Seattle, WA (US);
Jeffrey C. Pratt, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1119 days.

(21) Appl. No.: 12/192,064

(22) Filed: Aug. 14, 2008

(65) Prior Publication Data

US 2009/0122972 A1    May 14, 2009

Related U.S. Application Data

(60) Provisional application No. 60/987,744, filed on Nov. 13, 2007, provisional application No. 61/037,678, filed on Mar. 18, 2008.

(51) Int. Cl.
*H04M 3/00* (2006.01)
(52) U.S. Cl.
USPC .................... 379/265.12; 379/265.02
(58) Field of Classification Search
USPC ............. 379/265.12, 265.02; 705/14
See application file for complete search history.

(56) References Cited

U.S. PATENT DOCUMENTS

| | | |
|---|---|---|
| 5,557,668 A | 9/1996 | Brady |
| 5,724,418 A | 3/1998 | Brady |
| 5,970,132 A | 10/1999 | Brady |
| 6,026,087 A | 2/2000 | Mirashrafi et al. |
| 6,144,670 A | 11/2000 | Sponaugle et al. |
| 6,173,052 B1 | 1/2001 | Brady |
| 6,199,096 B1 | 3/2001 | Mirashrafi et al. |
| 6,212,192 B1 | 4/2001 | Mirashrafi et al. |
| 6,310,941 B1 | 10/2001 | Crutcher et al. |
| 6,347,139 B1 | 2/2002 | Fisher et al. |
| 6,356,632 B1 | 3/2002 | Foster et al. |
| 6,366,666 B2 | 4/2002 | Bengtson et al. |
| 6,408,066 B1 | 6/2002 | Andruska et al. |
| 6,434,230 B1 | 8/2002 | Gabriel |

(Continued)

FOREIGN PATENT DOCUMENTS

| | | |
|---|---|---|
| CN | 101918939 A | 12/2010 |
| EP | 2 250 575 | 11/2010 |

(Continued)

OTHER PUBLICATIONS

Bradley, A.D., et al., Automatically Controlling Availability of Tasks for Performance by Human Users, U.S. Appl. No. 12/136,673, filed Jun. 10, 2008.

(Continued)

*Primary Examiner* — Amal Zenati
(74) *Attorney, Agent, or Firm* — Knobbe Martens Olson & Bear, LLP

(57) ABSTRACT

Aspects of systems and methods for maintaining and operating agent nodes are provided. In some embodiments, calls, contacts, and other work units may be routed to individual customer service agents via a centralized queue based on a variety of factors. Some embodiments may provide market-based call pricing and customer service agent compensation.

30 Claims, 18 Drawing Sheets

(56) References Cited

U.S. PATENT DOCUMENTS

| | | |
|---|---|---|
| 6,463,148 B1 | 10/2002 | Brady |
| 6,487,290 B1 | 11/2002 | Le Grand |
| 6,510,221 B1 | 1/2003 | Fisher et al. |
| 6,512,825 B1* | 1/2003 | Lindholm et al. ........ 379/266.01 |
| 6,535,600 B1 | 3/2003 | Fisher et al. |
| 6,535,601 B1 | 3/2003 | Flockhart et al. |
| 6,560,330 B2 | 5/2003 | Gabriel |
| 6,661,889 B1 | 12/2003 | Flockhart et al. |
| 6,665,395 B1 | 12/2003 | Busey et al. |
| 6,707,811 B2 | 3/2004 | Greenberg et al. |
| 6,731,393 B1* | 5/2004 | Currans et al. ............... 358/1.12 |
| 6,791,974 B1 | 9/2004 | Greenberg |
| 6,914,899 B2 | 7/2005 | Siegrist et al. |
| 6,925,165 B2 | 8/2005 | Cohen et al. |
| 6,934,381 B1 | 8/2005 | Klein et al. |
| 7,016,532 B2 | 3/2006 | Boncyk et al. |
| 7,075,921 B2 | 7/2006 | Siegrist et al. |
| 7,092,509 B1 | 8/2006 | Mears et al. |
| 7,203,188 B1 | 4/2007 | Siegrist et al. |
| 7,222,085 B2 | 5/2007 | Stack |
| 7,315,518 B1 | 1/2008 | Siegrist |
| 7,367,051 B1 | 4/2008 | Siegrist et al. |
| 7,403,652 B2 | 7/2008 | Boncyk et al. |
| 7,519,200 B2 | 4/2009 | Gokturk et al. |
| 7,542,610 B2 | 6/2009 | Gokturk et al. |
| 7,599,950 B2 | 10/2009 | Walther et al. |
| 7,603,367 B1 | 10/2009 | Kanter et al. |
| 7,627,502 B2 | 12/2009 | Cheng et al. |
| 7,636,450 B1 | 12/2009 | Bourdev |
| 7,657,100 B2 | 2/2010 | Gokturk et al. |
| 7,706,521 B2 | 4/2010 | Gavagni et al. |
| 7,730,034 B1 | 6/2010 | Deflaux |
| 7,813,557 B1 | 10/2010 | Bourdev |
| 7,827,286 B1 | 11/2010 | Deflaux |
| 7,881,957 B1 | 2/2011 | Cohen et al. |
| 7,945,470 B1 | 5/2011 | Cohen |
| 7,949,999 B1 | 5/2011 | Willeford |
| 7,958,518 B1 | 6/2011 | Willeford |
| 8,001,124 B2 | 8/2011 | Svendsen |
| 8,160,929 B1 | 4/2012 | Park |
| 8,271,987 B1 | 9/2012 | Willeford |
| 2003/0169870 A1 | 9/2003 | Stanford |
| 2003/0220866 A1 | 11/2003 | Pisaris-Henderson et al. |
| 2004/0076936 A1 | 4/2004 | Horvitz et al. |
| 2004/0101127 A1 | 5/2004 | Dezonno et al. |
| 2004/0186778 A1 | 9/2004 | Margiloff et al. |
| 2005/0111653 A1 | 5/2005 | Joyce et al. |
| 2006/0002607 A1 | 1/2006 | Boncyk et al. |
| 2006/0143058 A1 | 6/2006 | Brunet et al. |
| 2007/0104348 A1 | 5/2007 | Cohen |
| 2007/0160188 A1 | 7/2007 | Sharpe et al. |
| 2007/0201684 A1* | 8/2007 | Boghani ...................... 379/360 |
| 2007/0204308 A1 | 8/2007 | Nicholas et al. |
| 2007/0208590 A1 | 9/2007 | Dorricott et al. |
| 2007/0279521 A1 | 12/2007 | Cohen |
| 2007/0286180 A1 | 12/2007 | Marquette et al. |
| 2008/0082426 A1 | 4/2008 | Gokturk et al. |
| 2008/0094417 A1 | 4/2008 | Cohen |
| 2008/0147470 A1* | 6/2008 | Johri et al. .......... 705/9 |
| 2008/0187125 A1 | 8/2008 | Siegrist |
| 2008/0229404 A1 | 9/2008 | Siegrist et al. |
| 2008/0260135 A1 | 10/2008 | Siegrist |
| 2008/0267377 A1 | 10/2008 | Siegrist |
| 2008/0276183 A1 | 11/2008 | Siegrist et al. |
| 2009/0010414 A1 | 1/2009 | Siegrist |
| 2009/0122973 A1 | 5/2009 | Jay et al. |
| 2009/0154688 A1 | 6/2009 | Jay et al. |
| 2009/0182622 A1 | 7/2009 | Agarwal et al. |
| 2009/0198628 A1 | 8/2009 | Stadler |
| 2009/0240652 A1 | 9/2009 | Su et al. |
| 2009/0261157 A1 | 10/2009 | Kumar et al. |
| 2009/0316687 A1 | 12/2009 | Kruppa |
| 2010/0070501 A1 | 3/2010 | Walsh et al. |
| 2011/0051920 A1 | 3/2011 | Dashe et al. |
| 2011/0051922 A1 | 3/2011 | Jay et al. |
| 2011/0286444 A1 | 11/2011 | Petrovykh |
| 2011/0310891 A1 | 12/2011 | Howe et al. |
| 2011/0320200 A1 | 12/2011 | Broman et al. |
| 2012/0101865 A1 | 4/2012 | Zhakov |

FOREIGN PATENT DOCUMENTS

| | | |
|---|---|---|
| JP | 2011514573 | 5/2011 |
| KR | 20100105773 | 9/2010 |
| WO | 9801987 A1 | 1/1998 |
| WO | WO 2009/091700 | 7/2009 |

OTHER PUBLICATIONS

Canadian Office Action in Application No. 2,703,737 dated Feb. 29, 2012.

Cohen, P.D., et al., Performing Automated Price Determination for Tasks to be Performed, U.S. Appl. No. 11/334,773, Jan. 17, 2006.

Amazon Mechanical Turk—Welcome, https://www.mturk.com/mturk/welcome, available as early as Aug. 28, 2008 [accessed Oct. 7, 2008].

Amazon Web Services Developer Community: What's that Tune?, http://developer.amazonwebservices.com/connect/entry.jspa?externalID=527, sample code originally posted Dec. 1, 2006, web site available at least as early as Jul. 15, 2008 [accessed Oct. 7, 2008].

Cohen, P.D., et al., Controlling Interactions With Users to Facilitate User Performance of Tasks, U.S. Appl. No. 10/990,771, filed Nov. 16, 2004.

Deflaux, N. A., et al., Managing Performance of Human Review of Media Data, U.S. Appl. No. 12/020,469, filed Jan. 25, 2008.

First Office Action in Chinese Application No. 200880115869.3 dated Aug. 2, 2012.

Kwiry—Text It Before You Forget It, http://www.kwiry.com, web site available at least as early as Aug. 13, 2008 [accessed Oct. 7, 2008].

Metz, R., Kwiry Service Lets Users Text to Remember Tidbits, http://biz.yahoo.com/ap/080813/tech_techbit_text_reminders.html?.v-4 [accessed Oct. 7, 2008].

Nordstrom, P., Human Augmentation of Automated Tasks, U.S. Appl. No. 11/560,700, Nov. 16, 2006.

NowNow.com, http://nownow.com/nownow/, web site available as of Aug. 28, 2008 [accessed Oct. 7, 2008].

What is Evernote?, Evernote Corporation, http://www.evernote.com/about/what_is_en/, web site available at least as early as Aug. 21, 2008 [accessed Oct. 7, 2008].

Willeford, J.C., et al., Transferring Entity-Related Data Between Storage Partitions, U.S. Appl. No. 11/842,730, filed Aug. 21, 2007.

Yahoo! Answers Welcome, http://answers.yahoo.com/info/welcome;_ylt=Anfqq_Hmba9H6DujAIJ3oR3py6IX;_ylv=3, web site available at least as early as Aug. 28, 2008 [accessed Oct. 7, 2008].

* cited by examiner

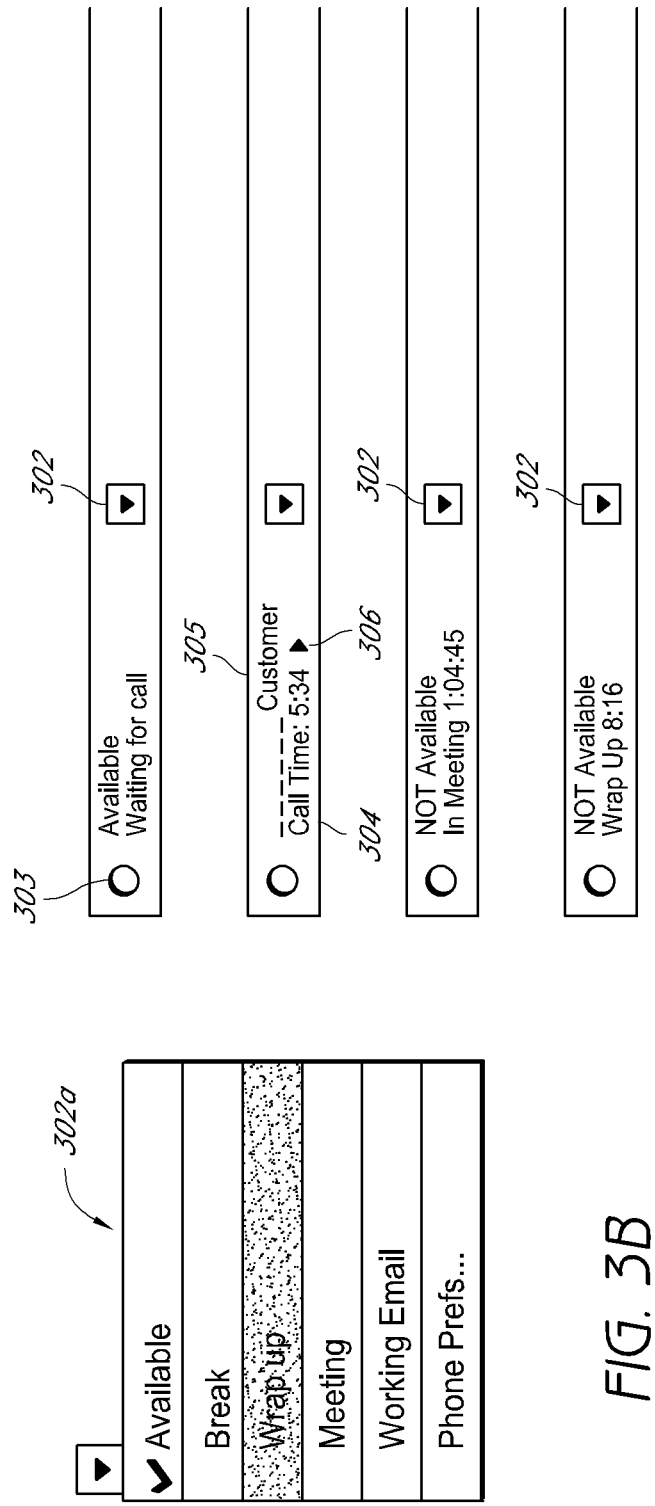

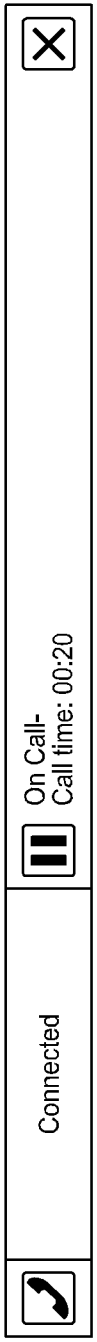
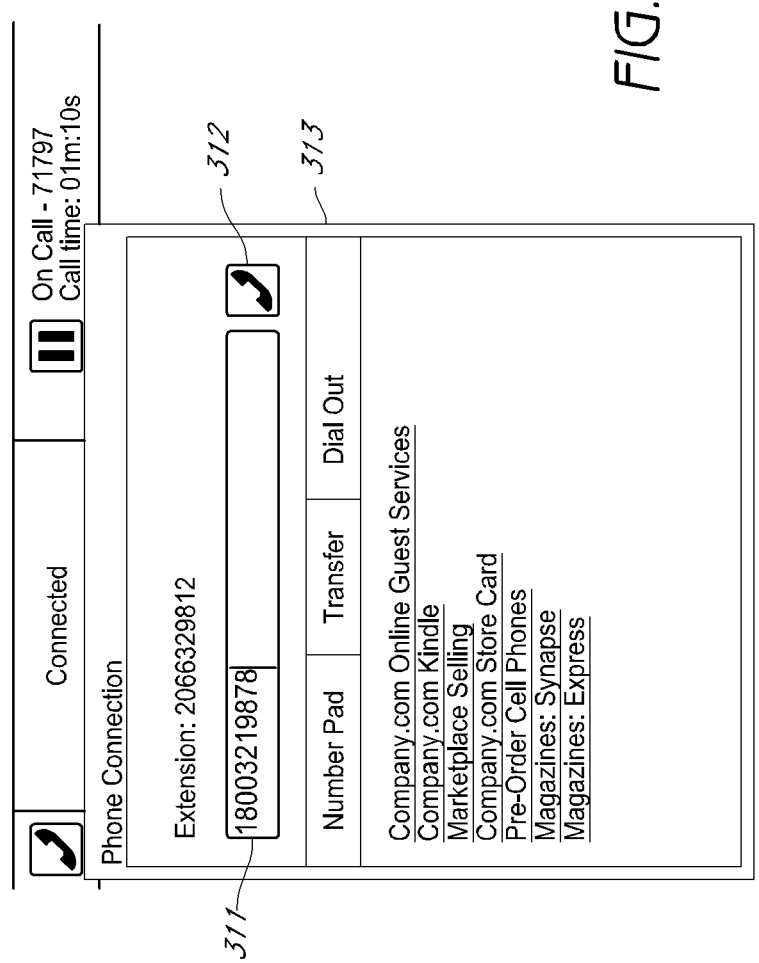
FIG. 3D
FIG. 3E

FIG. 3H

Customer Service Central | ⓘ New Alerts | Preferences | Log Out | ✕

📞 | ⇤⇥ Leave Chat | ≡ On Call - 2062661000 Call time: 00m:49s | ✕
 | | ≡ On Hold - 12062668738 Call time: 01m:24s |

FIG. 3I

Customer Service Central | ⓘ New Alerts | Preferences | Log Out | ✕

📞 | ⇤⇥ All Talk | ≡ On Call - 2062661000 Call time: 00m:06s | ✕
 | | ▲ On Hold - 12062668738 Call time: 01m:24s |

Customer Service Central | ⓘ New Alerts | Preferences | Log Out | ✕

📞 | ⇤⇥ All Talk | ▲ On Hold - 2062661000 Call time: 01m:35s | ✕
 | | ≡ On Call - 12062668738 Call time: 01m:29s |

| Allocation Table Name | Generalists Allocations |
|---|---|
| Day: | Monday |
| Applies To Queues | Us Primary<br>Us PrimaryGroove1<br>Us PrimaryGroove2 |

| Time (PST) | DAK | GAK | HTS | NCO | PSC |
|---|---|---|---|---|---|
| 8:00 am-8:30 am | 27.62% | 6.80% | 7.71% | 32.57% | 25.30% |
| 8:30 am-9:00 am | 27.62% | 6.80% | 7.71% | 32.57% | 25.30% |
| 9:00 am-9:30 am | 26.87% | 5.93% | 7.50% | 31.69% | 28.02% |
| 9:30 am-10:00 am | 26.87% | 5.93% | 7.50% | 31.69% | 28.02% |
| 10:00 am-10:30 am | 26.87% | 5.93% | 7.50% | 31.69% | 28.02% |
| 10:30 am-11:00 am | 26.87% | 5.93% | 7.50% | 31.69% | 28.02% |
| 11:00 am-11:30 am | 26.87% | 5.93% | 7.50% | 31.69% | 28.02% |
| 11:30 am-12:00 am | 26.87% | 5.93% | 7.50% | 31.69% | 28.02% |
| 12:00 am-12:30 am | 26.87% | 5.93% | 7.50% | 31.69% | 28.02% |

FIG. 4

| Queue | # Calls - Recent History |
|---|---|
| UsPrimary<br>Total Calls: 551 | DAK: 155 (28.13%)<br>GFK: 56 (10.16%)<br>HTS: 56 (10.16%)<br>NCO: 160 (29.04%)<br>PSC: 124 (22.50%) |
| UsPrimary<br>Total Calls: 38 | DAK: 13 (34.21%)<br>GFK: 12 (31.58%)<br>HTS: 2 (5.26%)<br>NCO: 8 (21.05%)<br>PSC: 5 (13.16%) |
| UsPrimary<br>Total Calls: 39 | DAK: 10 (23.64%)<br>GFK: 2 (5.13%)<br>HTS: 12 (30.77%)<br>NCO: 11 (28.21%)<br>PSC: 4 (10.26%) |

FIG. 5A

| Aggregated History, Includes:<br>UsPrimary<br>UsPrimaryGroove1<br>UsPrimaryGroove2<br>Total Calls: 628 | DAK: 178 (28.34%)<br>GFK: 70 (11.15%)<br>HTS: 70 (11.15%)<br>NCO: 179 (28.50%)<br>PSC: 133 (21.18%) |
|---|---|

FIG. 5B

| Ideal Allocation Percentage<br>(from allocation tables) | DAK: 27.62%<br>GFK: 6.80%<br>HTS: 7.71%<br>NCO: 32.57%<br>PSC: 25.30% |
|---|---|

FIG. 5C

| Internal/External | CSA Type | Queue Assignments | Blending Type |
|---|---|---|---|
| Domestic | New Hire - Groove 1 | 1. Groove-1<br>2. Primary<br>3. Groove-2<br>4. CellPhoneGen | Mixed/30 Sec |
| Domestic | New Hire - Groove 2 | 1. Groove-2<br>2. Primary<br>3. Groove-1<br>4. CellPhoneGen | Mixed/30 Sec |
| Domestic | Seasoned CSA (beyond first month) | 1. NonstdPayment<br>2. NonstdFulfill<br>3. Primary<br>4. Groove-1<br>5. Groove-2<br>6. CellPhoneGen | SL |
| Domestic | Digital Specialist | 1. Digital<br>2. Primary<br>3. CellPhoneGen<br>4. Groove-1<br>5. Groove-2 | Drain Until Empty |
| Non-Domestic | New Hire - Groove 1 | 1. Groove-1<br>2. Primary<br>3. Groove-2 | Mixed/30 Sec |
| Non-Domestic | New Hire - Groove 2 | 1. Groove-2<br>2. Primary<br>3. Groove-1 | Mixed/30 Sec |
| Non-Domestic | Seasoned CSA (beyond first month) | 1. NonstdPayment<br>2. NonstdFulfill<br>3. Primary<br>4. Groove-1<br>5. Groove-2<br>6. CellPhoneGen | SL |

601 points to the Domestic Seasoned CSA row; 602 points to the Non-Domestic New Hire - Groove 1 row.

FIG. 6

| Network | Call Center | Team | Reporting |

ACD Metrics Help

Real-Time Call Activity by Location    [ Show / Hide ]          701

| Drill Down | Call Center | Agents Staffed | Active | Available | ACW | Other | AUX | Calls Waiting | Oldest Call |
|---|---|---|---|---|---|---|---|---|---|
| ☐ | PSC | 47 | 29 | 0 | 2 | 1 | 12 | 3 | 0:29 |
| ☐ | GFK | 27 | 19 | 0 | 2 | 1 | 7 | 3 | 2:29 |
| ☐ | HTS | 19 | 12 | 0 | 2 | 1 | 12 | 0 | 0:00 |
| ☐ | HYD | 34 | 29 | 0 | 2 | 1 | 14 | 1 | 0:07 |
| ☑ | NCO | 31 | 29 | 0 | 2 | 1 | 12 | 1 | 0:29 |
|  |  | 14 | 12 | 1 | 0 | 0 | 1 | 0 | 0:00 |
|  |  | 4 | 3 | 0 | 0 | 0 | 1 | 2 | 1:17 |
|  |  | 7 | 4 | 1 | 0 | 0 | 2 | 0 | 0:00 |
|  |  | 9 | 9 | 0 | 0 | 0 | 0 | 26 | 17:32 |
| ☐ | GEM | 22 | 17 | 0 | 2 | 1 | 22 | 0 | 0:00 |
| ☐ | DAK | 12 | 9 | 0 | 2 | 1 | 12 | 3 | 0:29 |
| ☐ | SUTH | 21 | 18 | 0 | 2 | 1 | 12 | 3 | 0:29 |

Real-Time Call Activity by Skill    [ Show / Hide ]          702

| Drill Down | Skill | Agents Staffed | Active | Available | ACW | Other | AUX | Calls Waiting | Oldest Call |
|---|---|---|---|---|---|---|---|---|---|
| ☐ |  | 47 | 29 | 0 | 2 | 1 | 12 | 3 | 0:29 |
| ☐ |  | 27 | 19 | 0 | 2 | 1 | 7 | 3 | 2:29 |
| ☐ |  | 19 | 12 | 0 | 2 | 1 | 12 | 0 | 0:00 |
| ☐ |  | 34 | 29 | 0 | 2 | 1 | 14 | 1 | 0:07 |
| ☑ |  | 31 | 29 | 0 | 2 | 1 | 12 | 1 | 0:29 |
|  | NCO | 14 | 12 | 1 | 0 | 0 | 1 | 0 | 0:00 |
|  | PSC | 4 | 3 | 0 | 0 | 0 | 1 | 2 | 1:17 |
|  | GEM | 7 | 4 | 1 | 0 | 0 | 2 | 0 | 0:00 |
|  | HTS | 9 | 9 | 0 | 0 | 0 | 0 | 17 | 7:09 |
| ☐ |  | 22 | 17 | 0 | 2 | 1 | 22 | 0 | 0:00 |
| ☐ | DAK | 12 | 9 | 0 | 2 | 1 | 12 | 3 | 0:29 |
| ☐ | SUTH | 21 | 18 | 0 | 2 | 1 | 12 | 3 | 0:29 |

*FIG. 7*

| Statistic | Description |
|---|---|
| Agents Staffed | Number of agents "staffed" for the given skill (or skills). Agents in the states "Available", "OnCall", and "AfterCallWork" will contribute to this state. |
| On Active Calls | Number of agents that are actively talking to a customer, or having a customer on hold. For blended agents, only counts towards the skill for the current call. |
| In Available | Number of agents currently available to take a call. For blended agents, contributes to the total for each skill the agent is configured to handle. |
| In After Call Work (ACW) | Number of agents currently in the after call work state. For blended agents, only counts towards the skill for their most previous call. |
| In Other | Number of agents who are in the other state. For blended agents, contributes to the total for each skill the agent is configured to handle. |
| In Aux | Number of agents who are in any of the "AUX" states (see the State Details section). |
| Calls Waiting | The number of calls waiting. Rolled up by skill and agent group. |
| Oldest Call | The current queue time for the customer waiting in queue the longest. Rolled up by skill and agent group. |
| Avg Call Time (ACD Time) | The average call time (talk + hold) for all calls on the current day (based on the most recent calculation available). Rolled up by skill and agent group. |
| Average After Call Work Time (ACW) | The average time spend in after call work for all calls on the current day (based on the most recent calculation available). Rolled up by skill and agent group. |
| Average Hold Time | Average time that a customer spends on hold |
| Average Handle Time | The average time spent handling calls (includes talk + hold + acw) for calls on the current day (based on the most recent calculation). Rolled up by skill & location. |
| Average Speed To Answer | The average time a customer spends in queue waiting to talk to a CSA (based on the most recent calculation). |
| Abandoned Calls | Number of calls where the customer hangs up after they are put into queue but before they are handled by an agent (based on the most recent calculation). |
| Service Level 60 | The percent of calls that are routed to an agent before the customer has been in queue for 60 seconds (based on the most recent calculation). |

FIG. 8

| Call Center (click on call center to show / hide teams; click on team to show / hide agents) | Click to expand/collapse intervals | Calls Taken | SL 60 sec | SL 120 sec | Avg Talk Time | Avg ACW Time | Abandons | Avg Abandon Time |
|---|---|---|---|---|---|---|---|---|
| +DAK - All | Expand | 1369 | 86.2 | 96.8 | 8:23 | 0:51 | 16 | 2:32 |
| +GFK - All | Expand | 561 | 84.1 | 92.3 | 8:40 | 1:21 | 13 | 2:02 |
| +HTS - All | Expand | 513 | 90.2 | 99.3 | 8:50 | 1:13 | 15 | 1:30 |
| +NCO - All | Collapse | 2266 | 83.1 | 89.2 | 7:58 | 0:32 | 30 | 3:32 |
| | 09:30-10:00 | 513 | 78.3 | 80.1 | 7:58 | 0:31 | 14 | 3:30 |
| | 10:00-10:30 | 575 | 78.4 | 80.2 | 7:56 | 0:32 | 15 | 3:32 |
| | 10:30-11:00 | 601 | 79.1 | 80.3 | 8:01 | 0:32 | 16 | 3:32 |
| | 11:00-11:30 | 577 | 90.0 | 99.5 | 8:01 | 0:33 | 15 | 3:34 |
| -PSC - All | Expand | 1578 | 87.3 | 97.2 | 8:22 | 1:02 | 32 | 2:02 |
| +PSC - Team Voyagers | Expand | 400 | | | 8:40 | 1:20 | | |
| +PSC - Team Zambonis | Expand | 350 | | | 8:10 | 0:50 | | |
| +PSC - Team Zodiacs | Expand | 376 | | | 8:15 | 1:12 | | |
| +PSC - Team Crickets | Expand | 452 | | | 8:25 | 0:56 | | |
| amko | Expand | 18 | | | 8:10 | 0:54 | | |
| Aschmise | Collapse | 15 | | | 8:25 | 0:59 | | |
| | 09:30-10:00 | 4 | | | 8:22 | 0:55 | | |
| | 10:00-10:30 | 4 | | | 8:29 | 1:04 | | |
| | 10:30-11:00 | 4 | | | 8:24 | 0:58 | | |
| | 11:00-11:30 | 3 | | | 8:25 | 0:59 | | |
| Mzertuch | Expand | 12 | | | 8:40 | 1:12 | | |
| Charries | Expand | 20 | | | 7:55 | 1:18 | | |

FIG. 9

Event trace for agent Aschmise:

| Time (PST) | Event | Duration |
|---|---|---|
| 09:31:02 April 20, 2007 | AVAIL | 0:00:08 |
| 09:31:10 April 20, 2007 | Connected to call ID 5551234567, Skill = UsPrimary, Screenpop | 0:08:51 |
| 09:40:01 April 20, 2007 | ACW | 0:01:10 |
| 09:41:11 April 20, 2007 | AVAIL | 0:00:01 |
| 09:41:02 April 20, 2007 | Connected to call ID 5551236583, Skill = TUsPrimary | 0:07:02 |
| 09:48:04 April 20, 2007 | ACW | 0:00:44 |
| 09:48:48 April 20, 2007 | AUX - Lunch | 1:00:04 |
| 10:48:52 April 20, 2007 | AVAIL | 0:00:30 |
| 10:49:22 April 20, 2007 | Connected to call ID 5126851468, Skill = UsPrimary, Screenpop | 0:09:12 |

FIG. 10

| Statistic | Description | Aggregation Types /1101 | Skill Rollups /1102 | Intervals Rollups /1103 |
|---|---|---|---|---|
| Calls Handled | Number of calls handled by an agent and longer than 30 seconds. | Agent, Team, Call Center, Network | Per Skill, All Skills | By half-hour & by day |
| Calls Offered | Number of customer calls (whether or not they are handled by CSA) | Network | Per Skill, All Skills | By half-hour & by day |
| Calls Routed | Number of customer calls where the customer is either put into a queue or routed to an agent. These calls make it past the initial announcement | Network | Per Skill, All Skills | By half-hour & by day |
| Calls Abandoned | Number of calls where the customer hangs up after they are placed on hold, and before being connected to a CSA | Call Center, Network | All Skills | By half-hour & by day |
| Service Level 60 | Percent of calls that are handled in 60 seconds or less | Call Center, Network | Per Skill | By half-hour & by day |
| Service Level 120 | Percent of calls that are handled in 120 seconds or less | Call Center, Network | Per Skill | By half-hour & by day |
| Average Handle Time | Average time spent talking and in after call work | Agent, Team, Call Center, Network | Per Skill | By half-hour & by day |
| Average Talk Time | Average time spent talking | Agent, Team, Call Center, Network | Per Skill | By half-hour & by day |
| Avail Time | Time agent spends in state AVAILABLE | Agent, Team, Call Center, Network | All Skills | By half-hour & by day |
| Talk Time | Time agent spends in state BUSY | Agent, Team, Call Center, Network | Per Skill, All Skills | By half-hour & by day |

FIG. 11A

| Statistic | Description | Aggregation Types | Skill Rollups | Intervals Rollups |
|---|---|---|---|---|
| Average Hold Time | Average time that a customer spends on hold | Agent, Team, Call Center, Network | Per Skill | By half-hour & by day |
| Average After Call Work Time | Average time spent in After Call Work | Agent, Team, Call Center, Network | Per Skill | By half-hour & by day |
| Answer Time | Average time in which a call that is answered by a CSA stays in queue. | Call Center, Network | Per Skill | By half-hour & by day |
| Calls Transferred | Number of calls transferred. | Agent, Team, Call Center, Network | Per Skill | By half-hour & by day |
| Average Occupancy w/ ACW | The percent of staffed time an agent spends in the states AVAILABLE, BUSY, AFTER_CALL_WORK | Agent | All Skills | By half-hour & by day |
| Average Occupancy w/o ACW | The percent of staffed time an agent spends in the states AVAILABLE & BUSY | Agent | All Skills | By half-hour & by day |

FIG. 11B

| Statistic | Description | Aggregation Types | Skill Rollups | Intervals Rollups |
|---|---|---|---|---|
| Staffed Time | Time agent spends in states AVAILABLE, AFTER_CALL_WORK, and BUSY (working on a call or available to take a call) | Agent, Team, Call Center, Network | All Skills | By half-hour & by day |
| Aux Time | Time agent spends in states MEETING, BREAK, LUNCH, OFFLINE, EMAIL | Agent, Team, Call Center, Network | All Skills | By half-hour & by day |
| Break Time | Time agent spends in state BREAK | Agent, Team, Call Center, Network | All Skills | By half-hour & by day |
| Email Time | Time agent spends in state EMAIL | Agent, Team, Call Center, Network | All Skills | By half-hour & by day |
| Training Time | Time agent spends in state TRAINING | Agent, Team, Call Center, Network | All Skills | By half-hour & by day |
| Meeting Time | Time agent spends in state MEETING | Agent, Team, Call Center, Network | All Skills | By half-hour & by day |
| Lunch Time | Time agent spends in state LUNCH | Agent, Team, Call Center, Network | All Skills | By half-hour & by day |
| Avail Time | Time agent spends in state AVAILABLE | Agent, Team, Call Center, Network | All Skills | By half-hour & by day |
| Talk Time | Time agent spends in state TALK | Agent, Team, Call Center, Network | Per Skill, All Skills | By half-hour & by day |

FIG. 11C

INDEPENDENT CUSTOMER SERVICE AGENTS

CROSS-REFERENCE TO RELATED APPLICATIONS

The present patent application claims the benefit of U.S. Provisional Patent Application Ser. No. 60/987,744, to Jay et al., entitled "Global Automatic Call Distribution," filed Nov. 13, 2007, and to U.S. Provisional Patent Application Ser. No. 61/037,678, to Jay et al., entitled "Global Automatic Call Distribution," filed Mar. 18, 2008. The entire content of both of these provisional patent applications is incorporated herein by reference.

BACKGROUND

Many companies face an increasingly large number of pre- and post-sale contacts with their customers. Call centers have been developed as a centralized, scalable mechanism to handle the volume of calls across a variety of contact contexts, including, for example, sales and marketing contacts, technical support, and billing. However, call centers suffer from a variety of shortcomings.

For example, call center controllers may estimate the customer-call queue length at each call center and route a particular call to the queue that seems to have the shortest wait. If the decision is incorrect, the call might not be subsequently redirected to a different call center. This may lead to customers waiting at one call center even when agents are available at another. Because of this design, service levels may differ between various call centers, which may cause a negative impact on the network-wide service level.

Call centers may also experience call bursts due to delays in real-time information. Real-time information may be a few seconds out of date. When a call center controller makes routing decisions based on out-of-date information, it may route too many calls to a small call center or inaccurately estimate the size of the customer queue. Heuristics meant to address this exist, but these heuristics may break down in some cases and tend to make the overall system more complicated. Moreover, once a call center controller routes a call to a call center, it may have limited or no visibility into how long the transfer took, and whether or not the transfer was successful. Heuristics exist to handle the simpler problems, but a period of slow transfers (due to a nonstandard or faulting carrier routing, for example) may still result in call bursts.

In addition, call centers may rely on underlying platforms that are not controlled by the organization that runs the call center. So, for example, if there are problems in the underlying platform, the call center may not be able to address the problems directly. Rather, call center controllers may be designed to simply tolerate these issues. This may lead to the creation of a number of "watcher" systems that have heuristics designed to detect problems in the underlying platform. However, such watcher systems may create complexity in the code.

Routing calls based on the type of the call may also be difficult for a number of reasons: (1) call routing decisions may be made in several, disparate places (i.e., the decisions may be de-centralized); (2) call routing may be limited to the capabilities of private branch exchange ("PBX") systems; and (3) real-time information may not be available. All of these issues may make the task of effectively managing smaller routing queues extremely difficult. Inefficiencies in routing may cause call centers to be over-allocated (meaning that the center's agents are receiving or have received more than their allotted share of calls) or under-allocated. Over- and under-allocation of call center resources may cause customer service agents to be either too busy or not busy enough. In turn, this may cause increased attrition among customer service agents. Additionally, over- or under-allocation, and/or other inefficiencies in the match-up between call classifications and agent skills, may provide a variable service level experience for customers.

Improved routing algorithms may improve, but may not expunge inefficiencies in call center operation. In particular, at any given period, the volume of incoming calls may exceed or fall short of the available number of customer service agents. Accordingly, a 1-to-1 correspondence between disparate call and agent volumes may be difficult to achieve. Variability of call volume (including the variability in the types of incoming calls) may be attributable to both systematic and random processes. For example, the call volume during a peak hour of the day may be double the volume of a non-peak hour that same day. A peak day may see much more call volume than an off-day. Moreover, random (or merely unpredictable) variables may influence call volume. If a software vendor releases a product with a bug in it on a given day, the next day's call volume may be orders of magnitude higher than normal due to confused customers calling to ask why their new software doesn't operate properly.

Customer service agent availability may not be well-suited to meeting variations in call volume. Call center staffing may be planned out weeks or months in advance. In addition, a large and unexpected peak in intra-hour volume might go entirely unaddressed. By the time a manager realizes additional agents are necessary, contacted such agents, and enables them, the short-lived peak may have evaporated. Conversely, during periods of low volume, some customer service agents may be idle, using valuable call center resources.

The principles of the foregoing discussion are not limited to telephony-based call centers. Other fields of art may be similarly affected by difficulties in matching demand for services with supply. For example, email-answering centers where, for example, customer email queries are answered by agents, may face similar issues of unpredictable email volumes.

BRIEF DESCRIPTION OF THE DRAWINGS

Many of the attendant advantages and aspects of the present disclosure will become more readily appreciated as the same become better understood by reference to the following detailed description, when taken in conjunction with the accompanying drawings, wherein:

FIGS. 3A-3I depict illustrative elements of a user interface enabling a customer service agent to influence calls distributed by the system as shown in FIG. 1;

FIG. 4 depicts an illustrative allocation table storing capacity information for customer service agents using the systems shown in FIG. 1;

FIGS. 5A-5C depicts illustrative historical routing information for customer service agents using the system show in FIG. 1;

FIG. 6 depicts illustrative configuration information for customer service agent using the systems shown in FIG. 1;

FIG. 7 illustrates sample real-time data, in particular, call activity for agent sub-nodes managed by the system shown in FIG. 1;

FIG. 8 depicts an illustrative table of potential call metrics that may be recorded by the system shown in FIG. 1;

FIG. 9 illustrates sample historical data for agent sub-nodes and customer service agents managed by the system shown in FIG. 1;

FIG. 10 illustrates sample historical data for a particular customer service agent; and FIGS. 11A-11C depict an illustrative table of statistics that may be recorded by the system shown in FIG. 1;

DETAILED DESCRIPTION

Overview

A method and system are disclosed to automatically distribute calls or other types of contacts, e.g., electronic mail messages, text messages, work item requests, etc., from customers callers, or other users to customer service agents (CSAs). Some embodiments make it possible to build call distribution functionality around the open Session Initiation Protocol (SIP) standard and inexpensive "off-the-shelf" equipment—rather than propriety, closed phone-system standards and expensive, proprietary phone equipment. Such embodiments require nothing more from the call distribution system than the ability to direct-dial customer service agents—functionality that is supported by any phone system (including inexpensive SIP phone switches as are often used for internal corporate employees). Accordingly, embodiments allow call centers or, as referred to herein "agent nodes," to be equipped with relatively inexpensive phone hardware. Further, such embodiments may allow easy integration with outsourcers and phone-centric merchant partners, independent of their existing phone systems. Such embodiments may also support new customer service work scenarios, such as CSAs working from home, and setting up inexpensive seasonal "strip-mall" agent nodes without the prohibitive cost of purchasing a full-fledged PBX or other private telephone exchange system.

Some embodiments allow for centralized call queue management. Centralized queue management enables advanced call routing that may reduce customer hold times, or alternatively, allow fewer to handle the same customer load with the same service level as existing networks. Such centralized queue management may reduce inefficiencies that arise when phone queues are maintained at each call center, as in the conventional case. Some embodiments defer as much of the routing decision as long as possible, e.g., until an agent is available to take the call. This may improve service quality across the network. Centralized call queue management makes it possible to maintain a constant service quality level (SL) across all agent nodes in the network.

Components of an Illustrative Call Distribution System

Figure 1:
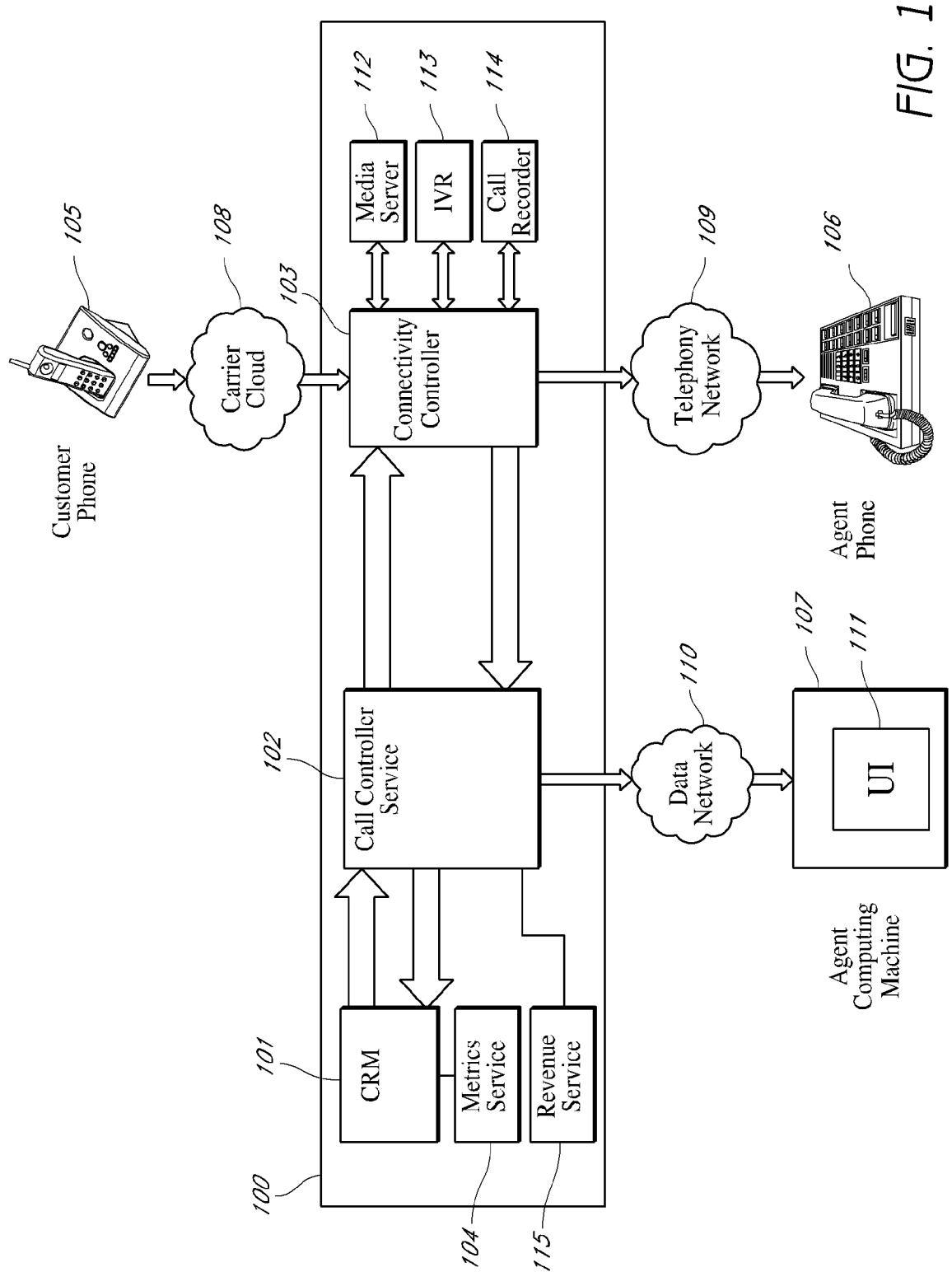
FIG. 1 is a schematic block diagram of an illustrative call distribution system for managing contacts between customers and customer service agents.
Figure 2:
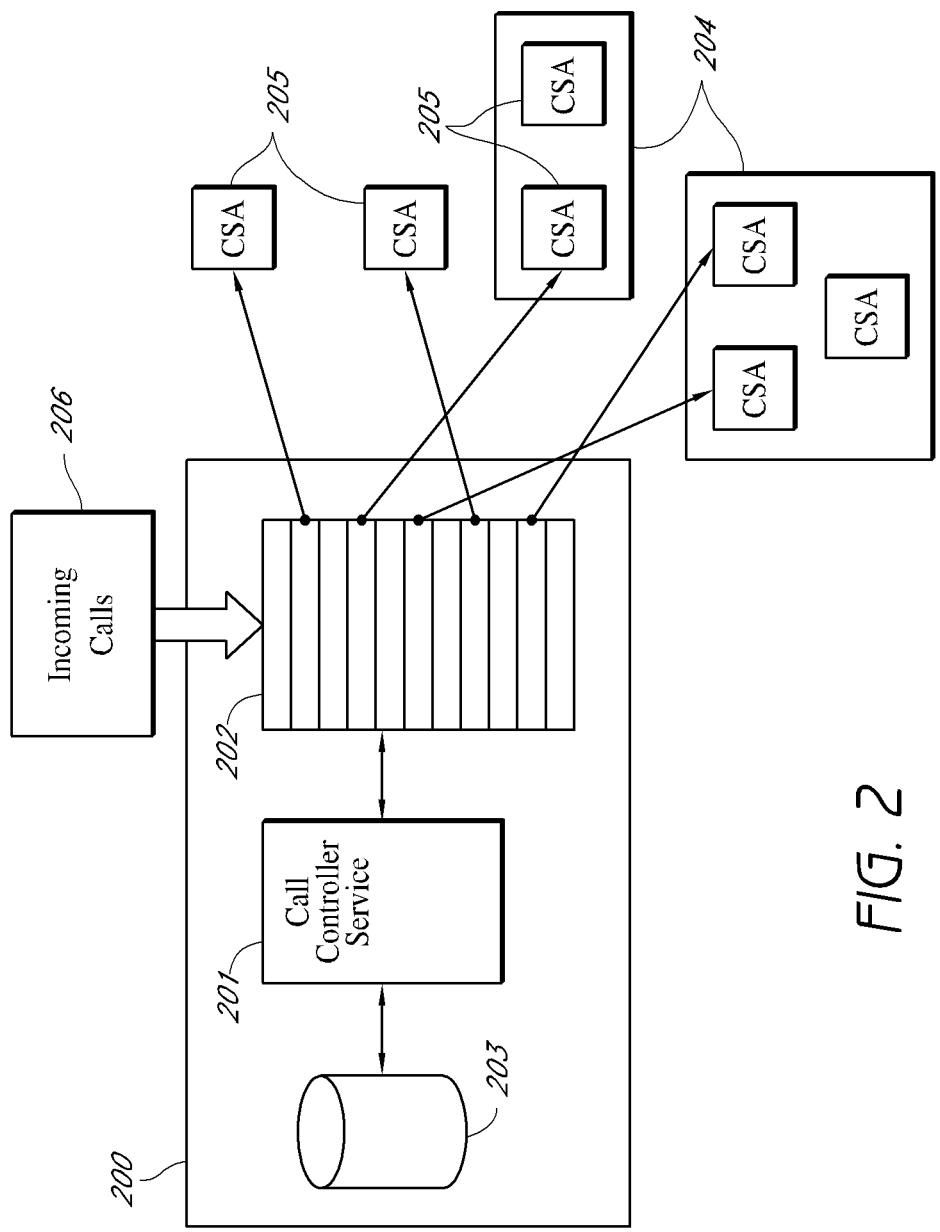
FIG. 2 is a schematic block diagram detailing call queuing and routing components of the system as shown in FIG. 1.

FIG. 1 depicts an illustrative call distribution system 100 for automatically distributing calls from customers to CSAs. FIG. 2 depicts additional illustrative elements of the system 100 particularly related to call queuing and routing. It will be recognized that many of the components described below are optional and that embodiments of the system may or may not combine components. Components need not be distinct or discrete. Components may be reorganized in the system. The system may be represented in a single physical server containing all of the subsystems described below or, alternatively, the system may be split into multiple physical servers.

The system 100 may include a customer relations module (CRM) 101, a call controller service 102, a connectivity controller 103, and a metrics service 104, each of which may be represented in hardware, software, or a combination thereof. The system is responsible for allocating, routing, and maintaining connections between customers (typically on phones) 105, and CSA phones 106 and computing devices 107. The system typically connects to customers and agents through telephony carriers 108 and 109 and data carriers 110.

In one embodiment, the CRM 101 enables the system 100 to manage its contacts and relations with its customers. The CRM may be composed of several databases (not shown) and may have links (not shown) to other systems, both directly and indirectly related to customer contact management. The CRM may also provide the business logic to manage agent nodes.

The call controller service 102 handles incoming customer calls, including, but not limited to: tracking agent state/availability (i.e., which agents are available to handle an incoming customer call); maintaining (potentially out-of-order) logical queues (not shown) of customers on hold for a particular CSA or call types (while customers on hold may be connected to a media service 112); routing calls, i.e., matching an available agent to an incoming customer call; and forwarding information generated by the operation of the telephony subsystem (103 and attendant components) to the metrics service 104.

The metrics service 104 is typically connected to the call controller service 102. This service stores information related to both customer calls and CSAs. Additionally, it may create reports (such as SL reports) based on real-time and historic data. The metrics service may provide information to the call controller service 102.

The connectivity controller 103 may handle the mechanics of manipulating telephone calls using SIP signaling (voice over IP technology), expose functionality that allows other systems (e.g., the call controller service) to manipulate calls, and propagate telephony events through the system 100. The connectivity controller 103 may connect customer phones 105 to agent phones 106. The connectivity controller 103 may make use of the following subsystems: a media server 112, an interactive voice response (IVR) system 113, and a call recorder system 114.

The media server 112 may handle the mechanics of playing announcements and hold music in a number of different contexts in the system. Customers may be connected to this server when they are on hold. This system may play "whispers" (i.e., informative introductory messages) to CSAs just before they are connected to a customer.

The interactive voice response system 113 may be a "robot" that sometimes handles customer calls before customers are transferred to a live CSA. IVRs may obtain preliminary information used to route calls and/or classify call types.

The call recorder system 114 records customer calls. The call recorder may provide a common interface to listen to calls that take or took place anywhere in the system 100.

A CSA will typically have two connections to the system: a computing machine connection, illustrated at 107, and a telephony connection, illustrated at 106. The computing machine is typically capable of displaying a user interface 111 to the system 100. Those of skill in the art will recognize that one or more CSAs may be located in a traditional monolithic call center (wherein the CSAs and the system 100 are in close physical proximity). Alternatively, a CSA may be located in close proximity to other CSAs (as in a "call center"), but remote from the system (which would then be housed in a "data center"). As another alternative, one or more CSAs may be remote from both the system data center and other CSAs. As such, the term "computing machine" is used broadly and without limitation, to include any sort of communication device capable to displaying a user interface from the system 100, such as a PC, a kiosk, a thin client, a home computer, a dedicated or embedded machine. Similarly, the agent phone system is used broadly and without limitation to include specialized phone equipment, VoIP equipment, complex PBX systems, off-the-shelf phones on traditional phone lines, and so forth. In some embodiments, agent phone systems 106 are not required to be connected via PBX or other telephone exchange systems. Moreover, for purposes of the present disclosure, a grouping of one or more CSAs, whether physically, in a monolithic call center or a data center; or logically, e.g., of CSAs who are not in close proximity to each other, may be referred to as an agent node.

The CSA user interface 111 displays content from the call controller service 102 or the CRM 101. Such an interface may be a propriety application running on the computing machine. Alternatively, it may be display a web page, browser, widget, applet, etc. generated or otherwise provided by the call controller service 102 or CRM 101. The link between the system 100 and the user interface 11 may be mediated by any of a host of data carriers and protocols, including HTTP, HTTPS, instant messaging, distributed memory, or a propriety protocol, or a combination of these.

Customers and customer phone systems, illustrated at 105, correspond to the end-users of the call system 100. Such customers are typically connected to the system via one of a host of telephony carriers 108. Such connections may also be established through newer, non-traditional protocols such as SIP, HTTP, IRC, other instant messaging protocols, and so forth. Customers may connect to the system using inexpensive phone equipment, complex PBX systems, or any other mechanism of communication.

System Operations and CSA Availability

An overview of the interactions between the system 100, customers, and CSAs according to one embodiment will be described. CSAs may be provided a user interface 111 on their computing machine 107 to the CRM 101. The link may be direct, or it may be mediated by the call controller service 102. To signal availability to the system, a CSA may press a key or select a user interface control from the CRM user interface 111 on the computing machine 107. The call controller service 102 may thereafter, via the connectivity controller 103, initiate a call to the CSA, via the CSA's phone system 106. The CSA may answer this call to signal to the system that he or she is ready and able to accept calls from customers.

If no customer is waiting for service in a queue, the CSA may maintain this silent-open (i.e., off-the-hook) connection to the system to indicate continued availability. To signal a transition from availability to unavailability (for example, to take a lunch or coffee break), the CSA may simply hang up the phone. The severed connection to the connectivity controller 103 may signal to the call controller service 102 and CRM 101 that a CSA is indicating that he or she is no longer available to take a customer call (or that a CSA has been unintentionally cut off from the system, due to, for instance, a fault in the network).

Alternatively, if there is a customer waiting in a centralized queue maintained by the call controller service 102 when the CSA signals availability, the customer and CSA may be connected immediately by the connectivity controller 103, or may be connected immediately after a whisper indicating the information about the call is provided by the IVR 113, such as the call type or customer classification. Alternatively or additionally to the whisper, the CRM 101 may cause information about the call, the customer, or the CSA to be provided to the CSA's user interface. Such information may be displayed as, for example, a "popup" or a "bubble." Whispers, popups, bubbles, and methods of communicating contextual information may also be employed during a call. So, for example, if the CRM 101 deduces additional information about the customer in the middle of a call, the CRM may cause such information to be whispered or displayed to the attending CSA.

After the call is completed, the CSA may hang up the phone and may thereafter be put into the "After Call Work" state. Those of skill in the art will recognize that this state may correspond to times when the CSA is debriefing or after-action reviewing a call, such as by writing notes, calling other CSAs, finalizing concessions, etc. When the CSA is ready to take another call, the CSA may signal renewed availability as described above.

If the CRM system 101 is down, the CSA may not be able to press or click a button to signal availability to system, or when the CSA does click a button, the CSA might not enter into the available state and therefore not receive calls. Some embodiments may include a phone-system-based interactive voice application that will allow CSAs to signal their availability through their phone system 106.

In some cases, carrier agreements can be negotiated that do not charge "per-minute" rates. Instead, charging for peak-concurrency (maximum number of lines in use at one time) may be negotiated. If so, there may be no penalty for maintaining this silent open connection. In such embodiments, peak concurrency to agent nodes may be improved (i.e., lessened) because customers on hold are connected to the connectivity controller 103 rather than to the physical location of the CSA's phone equipment 106. This may be advantageous if, as is often the case, the data center for the connectivity controller 103 is located in an area where telephony concurrency is cheaper than where CSAs tend to be located. This may be true if the data center (or centers) housing the system is located in a region with excellent connectivity.

It will be appreciated that a silent-open connection is not necessary for operation of the system. In alternative embodiments, CSAs may signal availability by accessing a control on the user interface 111 or another device. The call controller 102 may then direct the connectivity controller 103 to connect to the CSA's phone device 106, such as by calling it, when the call controller 102 has a customer to connect to the CSA.

The Call Control Panel

Figure 3A:
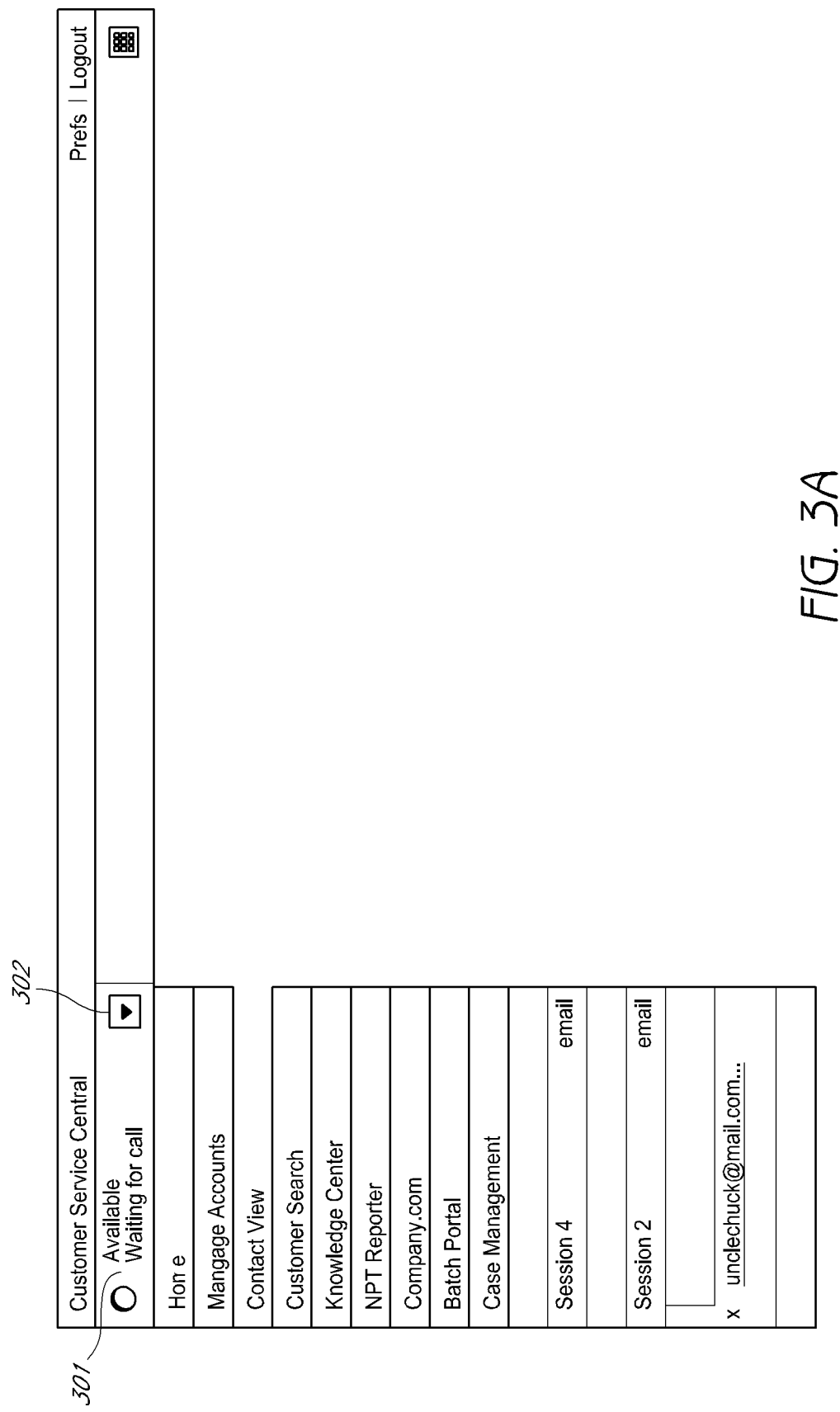
Figure 3F:
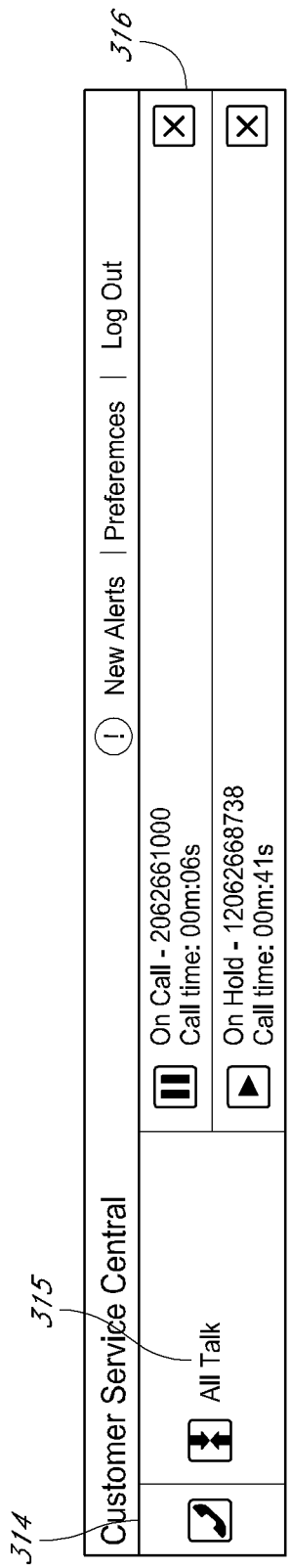
Figure 3G:
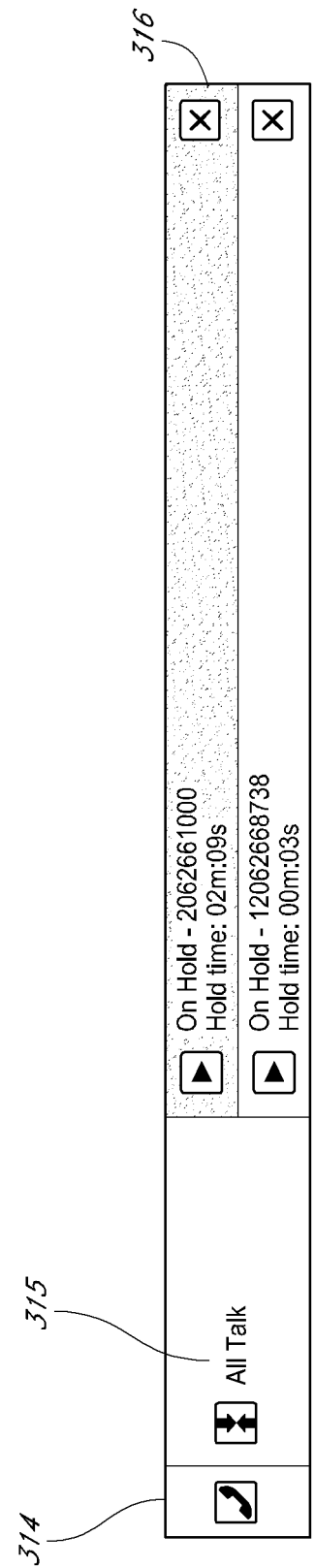

In some embodiments, when a CSA is authorized to (or the CSA's profile as known to the CRM 101 is configured for) taking phone contacts from customers, a "call control panel" 300 may appear in the CSA's user interface 111 in the computing machine 107. (See FIGS. 3A-3I.) This user interface may be established through means known in the art, such as HTTP, HTTPS, remote desktop, etc. The call control panel 300 may indicate the current state 301 of the CSA. In some embodiments, by default, the CSA starts out in the "Offline" state although it possible to start in other states like "Available." A CSA may change states by selecting a "set status" dropdown 302, which may bring up a status menu option 302a. (See FIG. 3B.) The set status dropdown 302 may disappear once a CSA takes a call (as it then may not be possible for them to change states). The call control panel 300 may be rendered differently depending on the CSA's current state as shown in FIG. 3C. A status indicator 303 may indicate different codes for different states, such as no color for waiting for a call, green for a call in progress, or yellow for an unavailable state. A timer 304 may time states or other events. An identification 305 of the caller may be displayed. Other details 306 may also be displayed. The call control panel 300 may be asynchronously re-rendered when the CSA's state changes, such as when a customer or CSA hangs up.

Advanced Agent States

There may be a large selection of states represented in the call control panel 300. A sample set of states is described below. This list is not exclusive; many other states, and combinations of states, are within the scope of the present disclosure. Moreover, a system need not implement all or any of these states to practice embodiments of the present disclosure.

Offline:

When a CSA configured to take phone calls first signs into the system, he or she may be automatically put into the Offline state. The system 100 typically will not send calls to CSAs in this state. However, some embodiments may not prevent CSAs in this state from doing other work. For example, a CSA in Offline may not be prevented from answering customer email contacts. Offline may be categorized as an "Auxiliary" state that contributes to the time spent in Auxiliary (see the metrics section below).

Available:

When a CSA or the system 100 sets the state to Available, the CRM may initiate calls to the CSA. As discussed above, the CSA may answer the call and maintain a silent open connection to indicate continuing availability to take a call. While in this state, the CSA may hang up the phone at any time. In this case, the CSA may be transitioned to the "Offline" state. Additionally, the CSA may select another state from the set status drop down menu 302a, for example to switch to "Break." At this point, the system 100 may disconnect the call, and not send any customer calls until the CSA returns to the Available state. While in the Available state, a CSA may switch to any of the Auxiliary states. Signing out of the system 100 will preferably automatically switch CSAs to the Offline state.

Available to Call:

When a CSA or the system 100 sets the state to Available to Call, the CRM may initiate calls to the CSA, but the CSA typically will not maintain a silent open connection. Connections between customers and CSAs may be initiated by directing a call to the CSA. The CSA may indicate unavailability or another state by, for example, accessing the set status drop down menu 302a.

On-Call:

While a CSA is on call with a customer, he or she preferably cannot switch status to Offline or Available as the dropdown menu 302a disappears. If the dropdown menu 302a is still available to the CSA (because, e.g., the page has not been re-rendered), the call to change states may fail and a popup may appear to indicate the problem. While on a call, the call control panel 300 may change to give the CSA appropriate options for this state. (See FIG. 3D.) These options may include putting the customer on hold 307, disconnecting the call 308, and transferring the customer or performing other functions 309.

On-Hold:

Putting the customer on hold may be accomplished by selecting the Hold control 307, e.g., as shown in FIG. 3D. The customer may hear hold music piped from the media server 112. The CSA's connection may be silent (potentially with periodic beeps) while the customer is on hold. A call timer 310 may track the customer's current on-hold time.

After-Call Work:

By either selecting a disconnect control 308, or simply hanging up the phone, from the On-Call state, the CSA may transition in into After-Call Work state (ACW). As discussed above, this state may be useful for "wrapping up" a call.

Transfer:

If, from the On-Call state, the CSA selects a transfer control 309, a popup may appear, allowing the CSA to input a transfer destination. (See FIG. 3E.) When the CSA inputs a transfer destination 311 and selects a dial control 312, a dial pad 313 may disappear and the customer may be put on hold while the CSA initiates the connection. (See FIG. 3F.) Upon connection of the transferee, the call control panel 300 may expand to track both conversations as show in FIG. 3G. In this state, the CSA may select an all talk control 315 to start a conference between all participants, as shown in FIG. 3H. Alternatively, the CSA may selectively disconnect participants (by selecting the appropriate "X" 316) or may remove himself or herself from the call (by selecting the leave chat control 317). The CSA may "cold transfer" a customer by, for example, selecting an appropriate control on the call control panel 300 or by dialing a target transfer number, connecting the customer to the transfer number, and simultaneously disconnecting himself Alternatively, the CSA may initiate a "warm transfer" by selecting another appropriate control or by dialing a target transfer number, connecting the customer to the transfer number, and disconnecting himself from the conversation after a period of time. The CSA may selectively place participants on hold (and later, un-hold them) by selecting the appropriate play or pause controls 318 or 319 as shown in FIG. 3I.

From the above description it will be appreciated that the system 100 may perform a warm or cold transfer of a caller to a transferee without requiring either: (1) that the CSA have a telephony device capable of accepting multiple connections; or (2) a PBX or other telephony device capable of effecting a transfer. Because the transfer has been performed by an open-standard connectivity controller 103 and directed by a call controller service 102, the costs and complexity of the system used to effect transfers may be reduced.

Other States:

In order to improve metric collection (as discussed below), some embodiments may use more states. This allows the system to have a more fine-grained view of how CSAs spend their time. An illustrative and non-exclusive list of such states is as follows: Lunch, Personal, Training, Email, Project, System Issues, BreakX (where X indicates the break number, e.g., Break1 and Break2).

Authorizing CSAs

As discussed above, some embodiments of the system 100 provide for CSAs located outside traditional call centers. As such, some embodiments will provide mechanisms for authorizing and enabling such CSAs. A particular mechanism may be specific to agent nodes or individual CSAs. Alternatively, a mechanism may work for all types of CSAs.

With reference to FIG. 1, an authorization mechanism may be provided by user interface 111 on a CSA's computing device 107 and/or on the CSA's telephony device 106. Some embodiments may cause a sequence of user interface 111 displays to be presented on the CSA's computing device 107. For example, the CSA may first navigate to a user interface display, e.g., a web page or portal, such as callcenter.com/login. The CSA may input his or her phone greeting name, phone login, and city code. In addition, the CSA may select a preference to display the call control panel (perhaps in addition to other options). However, the panel (and preferences) may not be available to all users, in particular those who do not have permission to be CSAs. The CSA may set a phone extension to be used when the connectivity controller 103 contacts the CSA through telephony equipment 106 (as described above). Upon successful login and setting of the extension, the call control panel 300 may open up with the CSA in the "Offline" state or some other state.

Call Queuing and Routing

FIG. 2 illustrates specific details related to call queuing and routing, according to some embodiments of the system 100 of FIG. 1. The illustrated system 100 contains the call controller service 102, a centralized call queue 202, and a data store 203. Depicted as external to the system 100 are an incoming call volume 206 (composed of calls from customers 105), which may be located on disparate networks), and a collection of individual CSA machines 107 and/or phones 106, represented for simplicity as single objects 205. Some, none, or all of the CSAs may be located in one or multiple agent nodes 204. As noted above, an agent node 204 may include one or more CSAs. In addition, an agent node 204 may include CSAs that are in close proximity to one another or CSAs that are remote from each other. In one embodiment, CSAs are grouped physically or logically into an agent node based on common profiles. Accordingly, calls may be routed to a particular agent node based at least in part on the profiles of the CSAs in the node. It will be understood that FIG. 2 illustrates only some of the components that may be included in the full system 100. FIG. 2 has been kept simple for ease of explanation. Accordingly, FIG. 1 and the accompanying text should be referenced for additional structural detail. As discussed earlier and depicted here, CSAs 205 may be co-located in common agent nodes 204 or may be working individually. CSAs typically maintain user interface links (not shown) to the system 100 as discussed above. The centralized call queue 202 may be physical, logical, and/or in addition to other queues maintained by the connectivity controller 103.

As incoming calls 206 are received by the system 100 (such as by dialing an organization's 800 number, dialing a local number, connecting via SIP or instant messaging, and so forth), they are typically placed into a queue 202 of waiting customers. At this time, they may be exposed to music from the media server 112 or integrated voice recordings from the IVR 113.

Over time, the call controller service 102 establishes links between customers in the queue 202 and CSAs 205. This may be done though the connectivity controller 103. The controller need not assign CSAs 205 to customers in the queue 202 in any particular order, such as first-in, first-out (FIFO) or last-in, first-out (LIFO). Rather the controller 102 may use out-of-order assignment based on considerations, such as those described below, and/or priority queues. In some embodiments, any or all of the queues as described here may be referred to as pools. The controller may be able to directly link CSAs in an agent node 204 to customers in the queue 202 without requiring or using a secondary, call center-level queue.

The call controller service 102 typically will access at least one data store 203 of information or additional system or component (such as the CRM 101) to determine which customers to route to which CSAs. This information is discussed in greater depth below, but typically may consist of information like how long the customer has been on hold, the customer class, the characteristics of a particular CSA, the type of the call, the history of the customer, and the utilization ("busy-ness" or allocation) of particular CSAs 205 and agent nodes 204.

In particular, in some embodiments, CSAs 205 may be selected to be connected to incoming calls based on state metrics related to the operation of the system 100, such as how long a given CSA 205 has been waiting in an "Available" state. So, for example, the call controller service 102 may, as a rule, connect a given call to a CSA 205 who has been waiting for a call at least as long as every (or most) other available CSAs 205. Another example of such state metrics include information about the number and type of other queues the CSA is placed on.

Other embodiments may select CSAs 205 for connection to particular incoming calls based on factors other than state metrics related to the operation of the system 100. For an example, a particular CSA 205 may be selected to answer a given call based on information related to the call, such as the caller's identity, the call type or skill required, and/or previous history with the system 100. For example, a caller who has placed an unusual number of calls to the system 100 may be given special consideration in routing. This information may be maintained in a data store 203.

As another example of selecting CSAs 205 for connection to particular incoming calls based on factors other than state metrics related to the operation of the system 100, a CSA 205 may be selected based upon the capabilities of the CSA 205. These capabilities may include the identity, profiles, and/or skills of the CSA 205, which are discussed more fully below. A CSA's identity may include the CSA's geographic location, nationality, language facilities, accents, and so forth. Capabilities may also include CSA 205 history information, such as feedback and training, information relating to the agent node of a given CSA 205, and so forth. CSA 205 history information may also include any previous history (such as prior calls or contacts) between the CSA 205 and the caller. Information about the relevant agent node may also be considered as part of CSA 205 identity.

The decision to route a given call to a particular CSA 205 may be dependent on one or more of the categories of factors discussed above. So, for example, in some embodiments, routing decisions may be made based on each of (1) a state metric, such as the amount of time a CSA has been waiting in a queue; (2) a call or caller characteristic, such as the call type or the number of times the caller has contacted the system; and (3) a CSA capability, such as previous history with the caller. Of course, embodiments may generally make routing decisions based on any information or data known to the CRM 101 or system 102 or imported from other systems, and so forth.

It will be recognized that some systems 100 may implement multiple queues, such that incoming calls to be answered are held in at least one queue and CSAs 205 are maintained in at least one other queue. Calls and CSAs 205 may be matched up out-of-order of their respective queues. Some embodiments may maintain multiple levels of queues for each or one of calls and CSAs 205.

The system 100 may maintain a queue of agents qualified (according to some metric) to accept a given call. So, e.g., a queue of "Premium" CSAs may be maintained to process or handle calls from customers who belong to an elevated payment tier. The metric used to qualify the Premium CSAs may be, for example, years of employment as a CSA 205, training, overall feedback, average customer satisfaction, language skills, and so forth. In some embodiments, the qualification metric is based, at least in part, on factors not specific to any particular call. Other example of "qualification queues" include queues of CSAs 205 with certain skills, CSAs who are available and/or have been available for a certain period of time, CSAs from a given agent node, and so forth.

CSAs 205 may then be chosen (or selected) from a qualification queue to handle a particular call. The system 100 may, but need not, allocate CSAs from a qualification queue based on a static ordering, such as LIFO or FIFO. Rather, the system 100 may dynamically select or identify a particular qualified agent from the queue of qualified agents according to a selection metric (which may be distinct from the qualification metric already discussed). The selection metric may be based on state metrics related to the operation of the system 100, such as how long a given CSA 205 has been waiting in an "Available" state.

On the other hand, the selection metric may be based on information other than state metrics of the system 100. For example, a particular CSA 205 may be selected, at least in part, from the "qualified" queue to answer a given call based on information related to that specific call, such as the caller's identity and/or previous history with the system 100. As another example, a CSA 205 may also be selected based, at least in part, upon the capabilities of the CSA 205, as described above.

Some embodiments use this two-level qualification and selection system to provide fine-grained control over call distribution and routing. For example, a qualification queue (or, equivalently, a pool) may be maintained, independently of any particular call, to indicate the CSAs 205 broadly capable of answering a call type. As calls of that call type come into the system 100, CSAs may be selected from the qualification queue based on characteristics particular to, for example, that given call, system needs, or CSA capabilities.

So, to continue the example from above, a particular CSA 205 in the "Premium" qualification queue may be selected from that queue and assigned to a particular caller because, for example, (1) the CSA 205 and caller have had a previous conversation and the caller expressed satisfaction with the CSA's performance, (2) the CSA's agent node is underutilized at the moment. This CSA 205 may be selected over CSAs 205 who have been waiting in the Premium CSA queue for longer periods of time.

Of course, the selection function (as well as the qualification function) may depend on any or all of the parameters discussed herein. Moreover, the selection and qualification functions may change dynamically. Of course, multiple levels of selections and qualifications may be implemented. Some systems may allow a CSA to be de-selected or de-qualified, according to some metric. Calls or CSAs 205 assigned to a particular queue may be removed from the queue and/or reassigned to another queue over time. CSAs 205, callers, and calls may also be ranked in a preferred selection order according to the selection or qualifications functions. Accordingly, the incoming call can be assigned to the top-ranked or optimal CSA for the incoming call.

In the foregoing discussions, reference has been made to routing (connecting) CSAs 205 and calls based on a many types of factors, such as call types, CSA skills, agent node allocation, and so forth. The following sections provide descriptions of these various types of routing.

Skill-Based Routing

As used herein, a skill may refer to a call type or classification, e.g., USPrimary800 Number, Shoes, PreferredCustomer, etc. Different skills may correspond to distinct toll-free numbers. Alternatively, several toll-free numbers may map to the same skill and calls to the same number may be assigned different skills based on subsequently-gained knowledge. The system may be able to route all calls from a variety of phone numbers, including numbers served by a PBX only.

Skill configuration may be made as simple as possible, so as to allow the system to scale properly. A user interface may be created to add, edit, and delete skills. Accordingly, the call distribution system 100 may send out email notifications (potentially to all users subscribed to an email alias) whenever changes to skills are made. Alternatively, hard-coded skill configuration may be used. The following types of information may be associated with each skill. This list is representative and non-exclusive. Not all items need be implemented.

Skill Name:
The short name of the skill, for example USPrimary, UKPrimary, ShoesUSPrimary, etc.
Description:
A longer description of the skill, potentially including the date created.
Routing Type:
The routing logic used for the skill. The choices may be "Simple" (such as first-come, first-serve) or "Allocation Table" (wherein calls of this type are routed according to percent allocation tables described below).
Welcome Message/IVR Home Page:
The name of a media file to play or the IVR Uniform Resource Identifier (URI) or script to execute for this skill.
Wizard:
A wizard that may be executed upon call arrival. The wizard may change the skill associated to the call.
Hours of Operation:
The hours of operation for this skill. The system 100 may maintain a weekly schedule whereby the system may indicate by intervals whether a particular agent node 204 hosting CSAs with training for this skill is open or closed.
Out-of-Hours Message:
A media message that is played when calls come in that are either: (1) out-of-hours (defined by the hours for the skill); or (2) there are no CSAs logged in who can handle the call. The message may be played in several contexts.
Hold Music Message:
The media to play as hold music. It may have any required messages embedded (such as "please continue to hold").

Skill information may be stored in a data store 203. Additionally, the system 100 may maintain a list of phone numbers that are mapped to each skill. When a call comes in, the call controller service 201 may scan a Dialed Number Identification Service (DNIS) to determine how to categorize the call. A sample, non-exhaustive list of data that might be maintained is as follows:

DNISName:
A representation of the number dialed by the customer.
Description:
A description of this DNIS.
Skill:
The skill associated with this DNIS
Media/IVRHome Page:
The name/URI of a media file or IVR homepage to be used for calls to this DNIS. This setting may override the corresponding skill's setting.
Special Routing:
Allows calls to have non-standard or special routing protocols. For example, whether calls placed to a given agent node 204 should be routed to a CSA within the agent node. Additionally, certain agent nodes may be excluded from a particular DNIS. For example, calls placed from a specific area code or location could be precluded (or disadvantaged) from connecting to a CSA located in a specific call center (or centers) in that same area code or location.

Some embodiments of the system 100 support skills-based routing (SBR) protocols. In general terms, SBR for incoming calls means the system 100 may attempt to match up incoming calls 206 with the best possible CSA 205. The call controller service 102 may implement SBR and may balance several dimensions of trade-offs in the SBR protocol. In general, SBR may be designed to support some or all of the following call routing priorities (where each priority may be specific to a skill or global): (1) meet service level quality goals for each customer whenever possible; (2) route an appropriate volume of call traffic to each agent node 204 (perhaps modified such that there is no negative effect on service levels); and/or (3) match the skills/training required for an incoming call with a CSA having the required skills (as stored in a data store 203). Of course, other priorities, or combinations of these priorities, are possible. A call controller service 102 may start by implementing only a subset of these protocols, or only an approximation of such protocols.

To accomplish skills-based routing, queues may be used to segregate calls. These queues may be logical and complementary to the incoming call queue 202. Routing queues may generally work as follows:

1. When calls come into the system 100, they may be assigned to a default skill depending on the number dialed. For example, each call to a particular 800 number may be assigned to the USPrimary skill (which has an associated queue).
2. A call's skill assignment may be changed by a wizard. This change may happen before the call is put into any queue. Alternatively, the call may be put into a queue and then have its skill assignment changed. This may cause re-classification to a different queue. Once a call is put into the queue, it may stay in that queue until: (1) it is answered; (2) the call is disconnected; or (3) (optionally) it is reassigned.
3. In general, the oldest call in a queue is answered first. Embodiments of the system may support differentiated service levels (SLs) for priority or preferred customers. This may be accomplished via a "weighting" factor so that the amount of time in queue is considered to be, e.g., (# Seconds In Queue)×(Weighting factor for call). The default call weighting may be 1, relative to a preferred customer call having a weighting of 2. In this example, the preferred customer call will generally be answered twice as quickly as a non-preferred customer call in the same queue.
4. As discussed above, wizards may be used to reassign the queue for an incoming call. These wizards may use information provided by the caller using IVR 113 or other mechanisms, or any information derivable from this. Because these wizards may rely upon so many systems to analyze a contact, it is envisioned that they will occasionally fail, in which case all calls may simply be placed in their default queue (which preferably does not require any wizard action).
5. In some embodiments, an unlimited number of queues may be created, and these queues may be created dynamically by the call controller service 102 as conditions, call volume, call type, or CSA skill sets change.

Once calls have been assigned to queues, they may be assigned (routed) to CSAs. In some embodiments, each CSA is assigned to exactly one queue, and may pull calls off of only that queue. In other embodiments, however, the call controller service 102 supports blended CSA allocation, which allows CSAs to handle calls from multiple queues. To accomplish blended allocation, for each CSA, the call controller service 102 may provide:

1. A list of queues upon which the CSA is capable of working. Depending on the blending type, one queue may get priority over other queues listed after it.
2. A blending type that determines how a CSA draws from multiple queues. The blending type may be irrelevant if the CSA is assigned to just a single queue. Blending types include (but are not limited to) the following:

Oldest Call.

When a CSA is configured with the Oldest Call blending type, the CSA will be assigned the oldest call (including weighting factor adjustments if any) in any of the queues the CSA is configured to handle. In this case, the order of the queues does not matter.

Drain Queues in Order.

According to this type, the first queue must be empty before a CSA will be assigned a call from the second queue, and the first two queues must be empty before the CSA will get any calls from the third queue (and so on).

Mixed.

This type allows a CSA to focus on one queue unless calls have been on hold for a long time in another queue (e.g., a threshold time value T is specified). More precisely, if no calls in any of the CSA's queues are older than T seconds (adjusting for the weighting factor), the CSA will drain queues in order (see above). Alternatively, if there are one or more calls that have been in queue more than T seconds (after adjusting for the weighting factor), the CSA will be assigned the oldest call in any of the CSA's queues (see above).

Some embodiments will provide a mechanism for configuring skills and CSA profiles. In some embodiments, modification of the lists of queues and CSA profiles may be done centrally and may be done in coordination with changes with phone contact analysis wizards (which, as described above, may assign incoming calls to the appropriate queue) and other telephony systems. Access to these queue names may be restricted. For example, some embodiments may preclude an outsourcer (e.g., a business that outsources its customer contacts to the system) from viewing the queues of an unrelated merchant, or for any other queue they are not set up to handle.

CSA profiles may apply to multiple CSAs, so altering a single profile will change the configuration of multiple CSAs. Some embodiments may use this functionality to provide a way to change multiple CSA's profiles so as to handle dynamic fluctuations in call volumes. To do so, the system may have the ability to do the following:

1. Configure CSA profiles (ordered list of skills, along with a blending type),
2. Assign/Edit the profile for given CSA.

This configuration may also be done by managers at each agent node 204, managers at the central system 100, automatically by the system in response to various events, or any or none of these. Individual agent node managers may be allowed to alter this configuration information as required to respond to spikes in call volumes. Some embodiments of the system centralize the creation and maintenance of CSA profiles (by restricting access to the interface where these configuration changes are made) to lessen the chances for configuration errors. In some embodiments, CSA profiles for each outsourcer may be created and controlled by the system or system administrators. In other embodiments, outsourcers may have an interface to set up and maintain their own profiles. Some embodiments will provide relatively fine-grained security permissions to profiles.

Allocation-Table-Based Routing

Allocation tables may be used to help ensure that each agent node takes appropriate call volume, i.e., matches its allocation or utilization targets. They provide a mechanism preventing an overstaffed agent node (i.e., one that has too many CSAs available for calls) from drawing volume away from (and, hence, penalizing) an agent node that is staffed properly. Preventing such penalties may be a part of budgeting or business planning.

Allocation tables may be used for at least these three purposes: (1) choosing a CSA and agent node when there are CSAs available from multiple agent nodes; (2) estimating agent node capacity, so that when there are queues at all agent nodes, these queues can be kept proportional to the agent node's capacity; and (3) allocating calls when real-time information (CSA availability) is not available. It is not necessary that embodiments implement allocation tables for each of these purposes.

To choose a CSA according to (1), the call controller service 102 may compile a list of CSAs that are available and eligible to take a given call. When there are multiple CSAs available, the call controller service 102 may make the choice so as to minimize the difference between the actual (current or historical) and ideal allocation percentages. If there is no allocation table that applies to any given queue, the call may simply be routed to the CSA who has been available the longest, without considering where that CSA is located.

In some embodiments, allocation tables specify the capacity of agent nodes relative to each other. For example, if agent node A has capacity 25%, and agent node B has capacity 50%, then agent node B will take roughly twice as many calls as agent node A when the allocation tables are used. Separate percent allocation tables may exist for day of the week and for each time interval. The time intervals represented in allocation tables may be continuous or discrete, e.g., in half-hour increments. FIG. 4 provides an example of capacity information that might be stored over the course of one day in allocation table.

Allocation tables may apply to an individual queue (skill) or a set of queues (skills). Allocation tables may be applied over multiple queues because the system may have many fine-grained skills. In some embodiments, providing a table for each queue is not necessary. So, for example, the system may provide skill definitions intended to allow CSAs to stay "in the groove," i.e., allowing CSAs to work repeatedly on a particular, narrow problem type in order to improve or maintain their efficiency in that problem area. Conceptually, each of these two skills would comprise part of the workload for a generalist Primary CSA, so the system may not want to attempt to forecast and provide individual allocation tables for each of these queues.

As calls may be routed to the CSAs at various sub-agent nodes 204, the call controller service 102 may keep a history of at least some of these routing decisions. This history will allow the system to match or approximate the relevant table allocation percentages. For example, consider the case where agent node A is supposed to take 70% of call traffic (for a given interval), and agent node B the remaining 30%. If all CSAs at A are busy during a burst of calls, the system will route calls to CSAs at B in order to maintain the customers' service level (SL). As such, agent node A will likely take less than the prescribed call volume during the burst. The call controller service 102 may maintain this history, or a representation thereof, to make up the difference later on. So, for example, after the burst has ended, the call controller service 102 may route a disproportionate (e.g., greater than 70%) volume of calls to A. This history may be infinite, day long, or configurable to some other interval, but may be cleared whenever the allocation values change (as may happen on interval boundaries).

As an example, suppose a new USPrimary call needs to be routed. The call controller service 102 may consider the allocation table and history information for each relevant queue, as shown in FIG. 5A (where DAK, GFK, HTS, and PSC are agent node 204 codenames). It may then aggregate the history information across the queues, as shown in FIG. 5B and compare that to the ideal allocation information represented in the relevant allocation table, as shown in FIG. 5C. The difference between actual and ideal allocations, as represented in the difference between FIGS. 5B and 5C, may form the basis for future routing selection (e.g., routing in a way that minimizes the difference between the ideal routing percentages and the actual (historical) percentages).

Some embodiments will be adapted to attempt to select calls out of the queue, and select which CSA to route the call to, such that the historical selection pattern matches the ideal allocation (which is based on or derived from the allocation tables) up to some level of accuracy. As such, some embodiments may use the following inputs:
1. The group out of which to make selections (e.g., the queue);
2. The past history of selections (e.g., the past metrics); and
3. A table that indicates the ideal selection distribution for each group under consideration (e.g., the allocation tables).

Given this information, according to some embodiments, a method for making the next selection may be the following:
1. For each possible selection of a call to a CSA, calculate what the hypothetical distribution would be for each group would be based on that selection.
2. Calculate the resulting global error for that selection by summing up the differences between the ideal distribution and the distribution which results for that selection. That is, calculate the global error for the selection which may be given by:

Global Error for Selection=SUM(ABS(actual % for group−ideal % for group))

where the summation is taken over all groups.
3. Choose the selection whose actual distribution most closely matches the ideal distribution. Alternatively, choose the first selection which does not increase the global error.

Those of skill in the art will recognize, however, that many alternatives are possible, and such alternatives may depend upon other statistics, including those listed in FIGS. 7, 8, and 9, and other mathematical functions, such as multiplication and addition, as well as universal and existential quantifiers.

Advanced Routing

Some embodiments of the call controller service 102 will have the requisite flexibility to make fine-grained routing decisions. This section demonstrates how such systems may be configured to provide for the following three representative routing criteria: (1) special treatment callers who have recently purchased cell phone equipment; (2) special treatment for callers using non-standard payment methods; and (3) keeping CSAs in the groove (as discussed above). It will be understood that these are merely three representative criteria, chosen to highlight the variability of the system, and these three could be replaced with more, fewer, and different criteria.

First, on occasion, an agent node operator's contracts with wireless carriers prevent that operator from allowing non-domestic CSAs to handle the contacts with the wireless carrier's customers. Therefore, some embodiments of the system may be adapted to route customers with a recent cell phone purchase to a domestic CSA (assuming that internal CSAs would be qualified to handle this queue). Such a system may include a "Cell Phone Generalist" queue and a call controller configured to allocate such calls to domestic CSAs. There may be another "Cell Phone Specialist" queue for CSAs having specialized cell phone training. Such specialized CSAs may be authorized and allowed to draw from both the Primary and the Cell Phone Generalist queue.

CSAs might be configured either with the service level blending type (as discussed above), or it might be preferable to give them a weighted preference for the phone queues queue (since there will be fewer CSAs working it than primary), using the mixed blending type. If the wizard detecting these contacts were to fail, calls would preferably be placed in the primary queue. Therefore, in some embodiments, all CSAs drawing from the primary queue would receive directions for dealing with such contacts.

Second, occasionally customers wish to make payments using non-standard means (wire transfers, etc.). Therefore, some embodiments may attempt to route such contacts to a pool of CSAs that are able to handle these relatively rare cases. This may be done by creating a "Non-Standard Payment" queue. Then, certain CSAs would be authorized to draw calls from the Non-Standard Payment queue, e.g., CSAs with more than one month experience, or CSAs with a certain required computer setup, or some other appropriate criterion.

Third, as discussed above, it may be worthwhile to keep a CSA "in the groove" by having them concentrate in a limited number of skill areas, at least for a certain period of time, e.g., an hour, a day, a month, or for an indefinite period. To accomplish this, a call controller service 102 may be designed to assign one queue to each (or several) contact type in which CSA may get "in the groove," and assign CSAs each to a particular specialized queue or queues. The mixed blending type may be used to ensure that service level in none of the queues, specialized or general, suffers.

As another example of the flexibility of the system 100, FIG. 6 illustrates configuration information that, according to one embodiment, simultaneously implements each of the routing criteria set forth above. For illustration, at 601, a seasoned CSA is configured to take non-standard payment calls on a service-level blending function. At 602, a new hire is configured to take calls in Groove1 under a mixed blending function.

The system 100 may also be configured to provide for feedback regarding CSA performance (and, perhaps, caller performance) to be measured and utilized. The system 100 may implement a review procedure, whereby a CSA (or a manager) may be able to review the actions of another CSA. So, for example, if a call is initially routed to a first CSA and the customer calls back later, the contact may be (intentionally or unintentionally) routed to a different, second CSA. The second CSA may, in the course of reviewing any records associated with the call, the ticket or case history, and the prior call, choose to flag the performance of the first CSA as satisfactory, unsatisfactory, exemplary, and so forth.

In some embodiments of the system 100, customers themselves may be able to provide feedback, such as through phone surveys conducted at the end of a call. A manager may also have the ability to listen in on conversations and flag them for further review. Similarly, the system 100 itself may have an automated means for flagging conversations, such as elevated-voice-response detectors. Feedback in regards to customers (i.e., customer reputations) may be implemented similarly.

The system 100 may make routing decisions based upon feedback. For instance, a CSA with exceptionally high reviews may get routed the "best" calls, the most high-priority calls (e.g., elevated server tier calls). Likewise, CSAs with poor feedback may be routed fewer calls or may be selected for training. If positive feedback for a given contact-CSA conversation exists, the system may be more likely to route calls by that customer to that CSA in the future. Both the storage of feedback and the routing of calls based on feedback may be performed by a feedback component, the connectivity controller 102, the CRM 101, or another component.

Independent CSAs and Market-Based Pricing and Routing

As discussed above, adjusting the supply of agents available to handle a given contact (where a contact may be a communication, task, service, or work item, such as, for example, a call, an electronic message, a job, etc.) to match the demand for servicing of that contact is not an easy task. Electronic messages may include email messages, text messages, faxes, voicemail, chat messages, twitter messages, etc.

Demand for task completion is subject to extensive short-term and hard-to-predict variability. For example, product or project launches or delays, bug discoveries, computer virus outbreaks, power outages, weather conditions, and so forth, independently or acting in combination, may all cause actual demand for a servicing of a given contact type to exceed or fall short of predicted demand. The overflow or shortfall may last for a minute, an hour, a day or a year. For example, a software company may plan to release a product on June $1^{st}$. Managers for a distribution center or system, such as a call center or email-answering system, may budget for increased contact volume (to handle all the new customers of the new product) in the first week after launch and assume that call volume may return to normal in the second week. If, however, last minute delays cause the product launch to be pushed back a week (to June $8^{th}$), the manager may find that actual demand on June $2^{nd}$ is far below predicted demand, while actual demand on June $9^{th}$ far exceeds predicted demand. In such a situation, unless the manager is able quickly to adjust supply to meet the actual demand, the manager is likely to experience unsatisfied customers and inappropriately utilized CSAs in the second week.

The challenge is for the manager to adjust available supply to meet actual demand. The available supply of CSAs for task completion may be sticky and slow to adjust to demand if, for example, CSAs have work schedules set in advance. It may be difficult to adjust the schedules of salaried CSAs on a moment's notice. Moreover, in general, a traditional distribution center will experience an average time for a CSA to be added. This average time, which may include contact time, commuting time, office set-up time, and so forth, may be greater than the minimum (or even average) time between significant, unpredictable demand shifts. Additionally, the supply of CSAs has significant short-term variability. For example, a community outbreak of flu, or bad weather, may cause the staffing of a distribution center to be far less than is budgeted for a particular day or time.

These factors (rigidity in supply, and short-term random variation in both supply and demand) may pose hurdles to efficient management of a contact-allocation system. Among other purposes, embodiments of the present disclosure may provide a market mechanism to reduce supply rigidity and mitigate the impact of short-term variation. Rather than paying a fixed salary for a CSA to be available to complete tasks (regardless of demand), a system implementing a market mechanism may allow CSAs to be paid (in whole or in part) based on a per-task compensation for actually completing tasks. Moreover, the market mechanism may allow the compensation paid to CSAs for supplying a given work unit to vary with demand for that work unit.

The value of per-task compensation and varying levels of compensation by demand may be limited unless CSAs are enabled to dynamically adjust their participation in the market. As such, in some embodiments, CSAs may also be allowed accept or decline to provide units of work at particular prices. However, if a CSA is required to commit to working at (or with) the distribution center for a period of time, the CSA's ability to decline individual work units may be more theoretical than practical due to switching costs.

As such, some embodiments of a system decouple CSAs from fixed supply schedules. By allowing CSAs to choose, on short notice and with reduced switching costs, whether to provide supply for work unit completion, a system may more effectively match actual supply with actual demand. As an example, to rectify an excess of demand over supply, a system may increase the compensation paid per unit of work. If the new compensation level exceeds the opportunity and switching costs of a particular independent CSA, that independent CSA will be incentivized to begin providing supply (if they were unavailable before) or to provide additional supply (as by working harder) if they were already working. Conversely, if actual supply is outstripping actual demand, the system may reduce the compensation paid per work unit. As new compensation levels fall below opportunity and switching costs, independent CSAs will reduce their availability, by working less diligently or by doing something else.

The rate at which supply adjusts to meet demand in such a system is at least partially dependent on the switching costs experienced by CSAs. For example, a CSA who must commute, e.g., 45 minutes to sit in a distribution center may experience high switching costs. As such, some embodiments provide mechanisms for reducing switching costs. For example, some embodiments of the systems disclosed herein attempt to decouple CSAs from distribution centers. If, for example, a CSA can service contacts while sitting at home or in a nearby coffee shop, the CSA may be more likely to participate in the market and may be more likely to adjust their availability in an efficient manner. Of course, some embodiments may provide the CSA with an option to come in to a distribution center. To decouple CSAs from distribution centers, some embodiments may provide remote interfaces for task completion. These remote interfaces will vary according to the task to be completed and may include (for example) computer equipment, telephony equipment, user interfaces, and/or physical objects and tools. Remote interfaces may be supported by, for example, computer and telephony networks and/or communication networks.

In particular, some embodiments may allow for independent CSAs and/or market-based pricing, such that CSAs may be located outside of traditional distribution centers and may be presented with dynamically varying prices for completing calls. Independent CSAs may choose to accept or reject a given call or class of calls.

For example, independent CSAs and market-based pricing may be implemented to provide just-in-time availability of CSAs to respond to customer chat sessions. If a peak volume of incoming chat requests is experienced, the system may automatically begin offering increased compensation to independent CSAs for answering chat requests. As the compensation increases over CSA opportunity costs, more CSAs will choose to answer chat requests. As such, the peaking volume of chat requests may be handled with a small or negligible decrease in service level (quality) of response.

As another example of the foregoing, the application of independent CSAs to one particular type of contact, namely telephone calls, will now be described in detail. It is to be understood that the principles disclosed below are applicable to other types of contacts; in many cases, the word "call" may be replaced with "contact," "work unit," "email," "task," "chat," and so forth, to enable an artisan to design a system for handling such objects.

As such, and with illustrative reference to telephony call centers, some embodiments of the call center system 100 described above may allow CSAs to be decoupled from the system 100 and/or the agent nodes 204. Accordingly, all that may be required of a CSA is a telephony connection and/or a data connection. Actual physical location in an agent node need not be required. It follows, then, that some embodiments may allow CSAs to be employed and compensated in non-traditional ways. Such embodiments may support new customer service work scenarios, such as CSAs working from home, CSAs hired as independent contractors, or inexpensive seasonal "strip-mall" agent nodes.

Some embodiments may also provide a market mechanism for at least some CSAs to be compensated on a per-call basis (as opposed to or in addition to an hourly rate or a salary). To accomplish market-based pricing for calls, some embodiments may comprise four distinct functions: (1) to determine prices for calls; (2) to communicate these prices to CSAs; (3) to allow CSAs to accept prices for calls; and (4) to account for accepted calls at the given prices.

With reference again to FIG. 1, in some embodiments prices may be determined by the CRM 101, the metrics service 104, a revenue service 115, the connectivity controller 103, or the call controller 102, either alone or in combination. In some embodiments, prices may be somewhat rigid. For example, prices for calls may be set at a certain, fixed value. Alternatively, prices may be fixed for individual call skills and determined in advance of real-time market conditions (as when, for example, prices are set by management). In other embodiments, prices may be flexible and variable based on a host of factors, such as (without limitation) aggregate CSA availability and skill set, aggregate call quantity and skill set, time of day, agent node allocation, etc.

The metrics service 104 and CRM 101 may store information related to the supply of "call answering ability," e.g., the status and characteristics of the CSAs. As described above, CSA profiles exist in connection with skill-based routing. These profiles may be extended to contain information useful in determining the supply of answering ability. So, for example, the system may know that only 1% of CSAs currently online have the necessary skills to answer a particular call. This information would likely support a relatively high price for answering a given call. Alternatively, if a given call could be answered by 95% of CSAs, this information may support a relatively low price for answering a call. If certain times of day have typically fewer CSAs available, then the call controller service 102 may set higher prices for answering calls. In general, prices may be varied based upon any of the aggregate information listed in FIG. 7, 8, or 9, or any other aggregated data obtained about answering ability.

Prices may also be determined with respect to particular CSAs. So, for example, a particularly senior or effective CSA may be offered prices higher than a less experienced or effective CSA. Similarly, CSAs who are "in a groove" as discussed above may be offered different prices. Prices may be varied based upon specific information about the telephony or computing costs of a particular CSA. Prices may also be varied based on any feedback obtained about the particular CSA. In general, prices may be varied based upon CSA-specific information.

The metrics service 104 and queues may also store information related to the demand for call answering ability, e.g., the status and characteristics of the incoming calls 206. As described above, the queue represents, and the metrics service 104 maintains, information about call quantity and skill types. Thus, prices may be varied based upon the expected call volume of calls of a particular type or skill, or the time of day, the length of time for which a particular call has been waiting for servicing. Again, in general, prices may be varied according to the call-specific information listed in FIG. 7, 8, or 9, or any information known about incoming calls, either in aggregate or on a per-call basis. Prices may be varied based upon premiums that outsourcing companies are willing to pay.

In some embodiments, prices may be determined based on information in real time and may fluctuate rapidly. In other embodiments, prices may be determined in advance and/or may be held fixed for some period of time. Prices may fluctuate or change based on acceptance patterns of CSAs. In some embodiments, CSAs, agent nodes, or other entities may submit bids for the prices at which they would be willing to accept calls. The call controller service 102 or other component could accept prices in a lowest-price-first, a Dutch auction, or some other algorithm. Prices may be per-call, per-minute-of-call (or other time interval), or per-minute-of-availability (of other time interval), or some combination of these or other event types.

With reference to FIG. 1, price information may be communicated to CSAs via the user interface 111 (as described above) to the CSA's computing machine 107. The call control panel 300 (as shown in FIG. 3A-I) may be augmented to display an offered price for a given call, an offered price for future calls, future price schedules for calls, and so forth. CSAs may be allowed to choose or decline particular price offers. CSAs may be able to select among alternative prices for different call types or times. In other embodiments, CSAs may be able to submit their own prices for particular call types. CSAs may be able to accept prices for multiple call skill types. Alternatively, at least some price-acceptance functionality could be located in agent nodes and agent node management. So, for example, a particular agent node could set or manage prices for all of its CSAs.

Some embodiments may allow CSAs to be notified, e.g., by email, popup, instant message, text, phone call, or other notification, if prices meet, exceed, or fall below a certain level. Other embodiments may support filtering prices, such that only a subset of prices will be viewable to a particular CSA. CSAs may have the ability to filter prices according to any criterion or criteria, and this may affect the display on the phone control panel or other user interface.

In some embodiments, CSAs may accept offered prices by selecting an appropriate user interface control on the call control panel 300 or other user interface. Alternatively, prices may be accepted by the CSA going into an Available state. Changes in prices may be implicitly accepted by CSAs who remain available, or until a CSA revokes acceptance. Alternatively, changes in prices may automatically end a CSA's acceptance, which may lead to placing the CSA in an Offline state. In some embodiments, a CSA may alternatively reject a call, or a price for a call, either actively (such as by activating a control) or passively (such as by not answering a call or by transitioning to an alternate state.

The user interface or call control panel 300 may communicate acceptances to the call controller 102, which may subsequently store the acceptance information or route it to the revenue service (115 of FIG. 1). The acceptance information may be stored in connection with an individual CSA profile, an accounting subsystem of the system 100, or an external accounting system connected to the system 100 by a network link. Alternatively, acceptance of price information may be stored locally on the CSA's computing machine 107 and subsequently transmitted to the system 100 or an external system. The price acceptance information may be received and maintained by the agent node 204 to which the CSA belongs (if, indeed, the CSA belongs to such a center).

In some embodiments, once a CSA accepts a price, calls may be routed to that CSA according to embodiments discussed above. When a CSA receives a call (or completes a call), that CSA may be credited for the negotiated price of that call. Recordation of a completed or accepted call may be transmitted to an entity responsible for maintaining such records. This entity may be the same entity used to maintain price acceptance information as discussed above (e.g., revenue service 115), or the entities may be different.

Some embodiments will maintain records containing price and call acceptance information. This information may be maintained and controlled by the revenue service 115. At some point, CSAs will be paid for their efforts. The gross payment amount for a particular period may be the sum of the product of each payment quantum (such as received call, completed call, hour of availability) and the negotiated price per payment event. Using revenue and payroll mechanisms well known in the art, this amount may be transferred to the account of an employee-CSA for disbursement purposes. CSAs that are employees of a particular agent node may be paid by the agent node, or the system (or system owner) or revenue service 115 may cause such funds to be transmitted directly to the agent node (which may subsequently pay the CSA). CSAs which are not working out of an agent node may have personal payroll accounts with the system 100, revenue service 115, or another system which may be credited the appropriate amount.

Alternatively, CSAs may have consumer accounts with the system 100, the system operator, a third-party payment operator, a credit or debit card, or other form of account. The system may cause a credit, such as by direct fund transfer, to the appropriate account. This account may be shared among alternatively-purposed systems owned by the system 100 operator. The revenue service 115 may maintain this information, or may communicate with other systems to maintain this information. So, for example, a CSA may purchase a book from a retailer (thus incurring a debit of $20) and answer ten calls at $3 per call (thus incurring a credit of $30) within some time period. Some embodiments may be configured to direct both the credit and debit to the account of the CSA. In some embodiments, the CSA's account may thereafter show a credit balance of $10.

It will be appreciated by those of skill in the art that embodiments which include dynamic and/or per-event pricing provide flexibility and efficiency in hiring and training of CSAs. For example, such embodiments may incentivize CSAs to complete an optimal amount of training. It is possible that CSAs, when paid according to traditional per-hour means, may acquire either too much or too little training. In particular, CSAs may undergo a fixed training period (of say, 2 weeks) prior to handling calls. It is possible that such training may include training for skills that the CSA is either unwilling or unlikely to perform on the job (especially if an "in the groove" routing system is used).

On the other hand, if a CSA is capable and willing to handle specialized calls but does not receive training or authorization in such skills, the CSA may be undertrained (relative to optimal training levels). This may occur if the CSA is not given an incentive to train and work in specialized skills (as can happen when CSAs are paid by the hour regardless of call type), if there is no effective mechanism for fine-grained routing, or if there is no effective mechanism for detecting the fine-grained skills of a particular CSA.

Some embodiments of the present disclosure provide incentives for CSAs to acquire as much (and only as much)

training as is rational for them to acquire, given the prevailing market prices of skills. So, for example, if there are few CSAs qualified to handle a given call skill, per-call prices for such skills are likely to be high (as described above) relative to other skills. These high prices will encourage CSAs to voluntarily undergo training to be qualified for the skill. The influx of CSAs qualified in the skill will increase available call-answering supply and, therefore, per-call prices for the skill are likely to fall. Alternatively, if too many (or just enough) CSAs are trained to perform a given task, prices for that task may fall, which may reduce the number of future CSAs who train for the given task.

Some embodiments may also reduce rigidities in employee hours. As discussed above, the volume of calls incoming to the system may vary widely over the course of minutes, hours, days, and months. Traditional pay-by-the-hour systems may experience either understaffing (if actual influx exceeds expected influx) or overstaffing (if expected exceeds actual). However, such conditions may not be rectified for a period of time, e.g., the next prediction cycle, or the next hour, or the next day. In a system with dynamic pricing and/or independent CSAs, a condition of overstaffing will lead to reduced prices, which may incentivize some CSAs to spend their time doing something else. For CSAs based at home or other locations, this may be as simple as switching to another task not likely to be allowed or accepted in a traditional call center. On the other hand, in the case of understaffing, CSAs will be incentivized to take advantage of the higher prices. These CSAs may notice the high prices, for example, if they are set to be notified by email or text (or other system) of price levels or limits, or if they keep part of the user interface to the system open on their computers or other devices. Some embodiments may provide relatively low switching costs for CSAs (and for agent node operators). For example, a CSA may be conducting an online search for shoes on his own time in his own house when he receives a notification that prices for one of his skills have hit $5/call. This may cause him to login and set his state to Available in order to take advantage of the prices.

Some embodiments may provide independent and/or non-traditional training of CSAs. Training may be done in a modular form (e.g., in relatively discrete units which may taken independently by CSAs) and may be provided over the data connection to the user interface (FIG. 1, 111), the telephony connection, or both. Training may also be provided at agent nodes or other physical locations.

While the foregoing description has been in the context of call centers, those of skill in the art recognize that the principles of independent CSAs apply far more broadly. In particular, the unit of work for which an independent CSA may contract has been described as a "call" but just as easily could have been a communication, service, task, or contact, such as an email, a chat or instant message, etc. The system 100 may also implement multiple types of contacts (e.g., CSAs answering phones and sending emails). So, for example, in such a system, the call controller 102 and/or telephony controller 103 may be replaced, complemented, or augmented with an "email controller," which may perform functions on emails similar to the functions performed by the call controller and telephony controller on calls.

Figure 12:
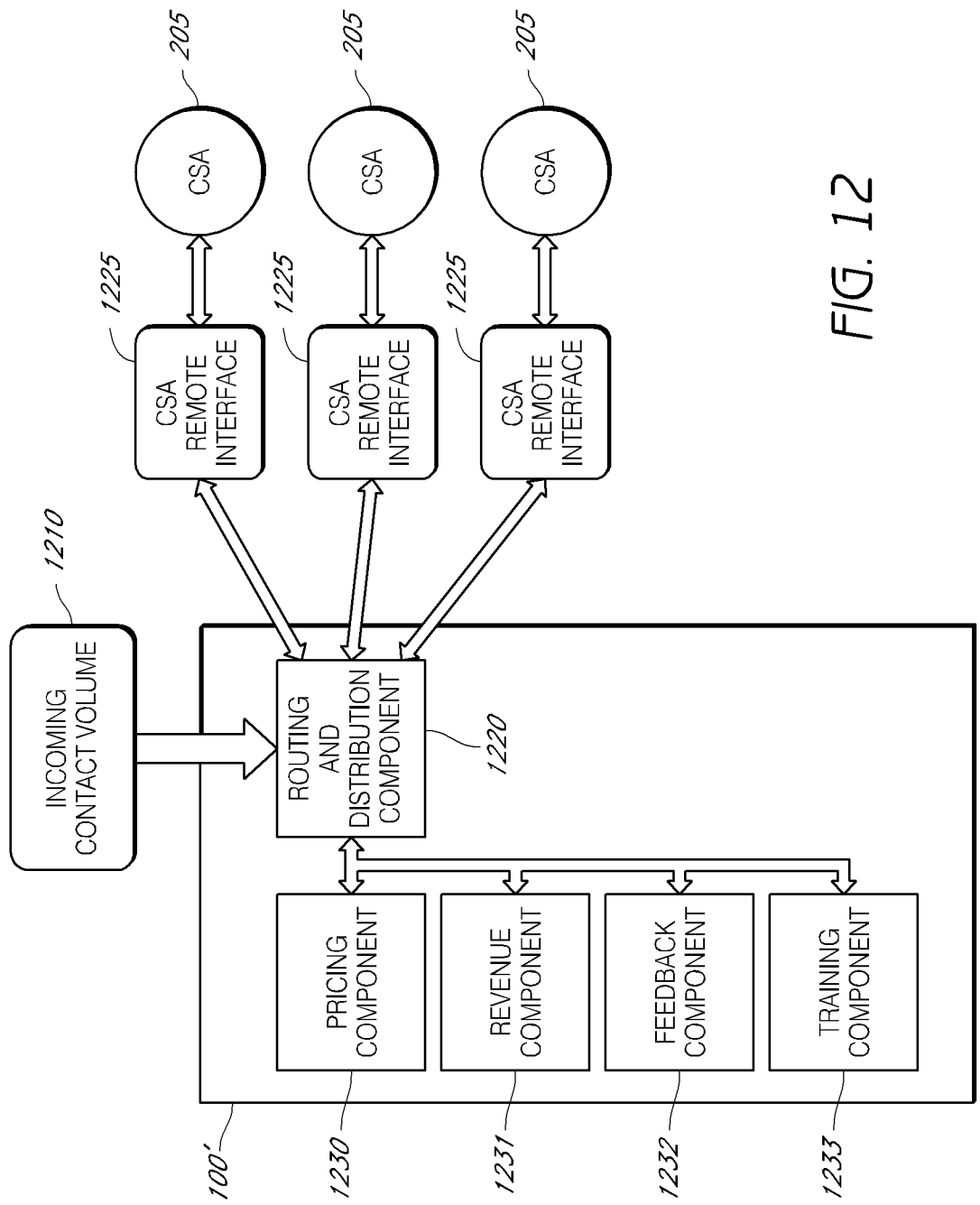
FIG. 12 is a schematic block diagram of an illustrative contact distribution system that may use market-based pricing information to route multiple types of contacts to independent customer service agents.

FIG. 12 provides an alternative example of a system 100' implementing distribution of contacts. In FIG. 12, a system 100' routes the contacts in an incoming contact volume 1210 to CSAs 205. In this context, contacts may be any of the items described herein, such as phone calls, emails, instant messages, and so forth. The incoming contact volume 1210 may include multiple types of contacts. The system 100' receives contacts from the incoming contact volume 1210. A routing and distribution component 1220 of the system 100' may transfer, route, connect, or otherwise direct the incoming contacts to remote interfaces 1225 of the CSAs 205. The system 100', and the CSA remote interfaces 1225, may contain specific hardware and/or software used to implement connectivity for the incoming contact types. For example, if the system 100' is to handle emails and phone calls, it may include networking and telephony software and/or hardware in either or both of the routing and distribution component 1220 and at least some of the CSA remote interfaces 1225. Remote interfaces 1225 may be standardized or may vary. Not all remote interfaces need implement functionality for each contact type. The remote interfaces 1225 may provide mechanisms for CSAs 205 to indicate availability, unavailability, and some or all of the states otherwise described herein. The remote interfaces 1225 may be in communication with the system 100', such that information or functionality provided by the components of the system 100' may be transmitted to the remote interfaces 1225; similarly, the remote interfaces 1225 may transmit information (e.g., CSA acceptances) back to the components of the system 100'.

The routing and distribution component 1220 may be connected to a pricing component 1230. A pricing component 1230 may determine prices and other data associated with a contact as described above. So, for example, the pricing component 1230 may adjust the offer price for one particular type of contact (e.g., instant messages) according to market information or conditions, such as, an unusually large number of incoming instant messages. Pricing information may be pushed out to remote interfaces 1225.

A revenue component 1231 may track, utilize, or otherwise process information from the components and remote interfaces 1225, such as pricing and acceptance information. A feedback component 1232 may be used to provide information to the routing and distribution component 1220, the remote interfaces 1225, or another component. Feedback may be used to route a customer (if, for example, the customer has previously left positive feedback for a CSA, that customer might be more likely to be routed back to that CSA on subsequent calls).

A training component 1233 may similarly use and provide information. For example, the training component 1233 may provide training information to the pricing component 1230 that may be used to determine supply of a particular CSA skill. The training component may also receive information and may thereby calculate which CSAs need, have, or would likely benefit from a particular unit of training. The training component may provide training directly to particular CSAs 205 through their associated remote interface 1225.

As an example of the operation of the system 100' of FIG. 12, assume the incoming contact volume includes an email from a particular user. The pricing component may determine that the prevailing rate for answering emails for this particular user and contact type and skill is $2. This information may by pushed to remote interfaces 1225, whereby CSAs may determine whether they are "available" to answer emails at $2/email. The routing and distribution component 1220 may thereafter select a CSA from among the CSAs willing to accept $2/email. The routing and distribution component 1220 may transfer (or otherwise distribute the email to the remote interface 1225 of the selected CSA 205, such as by causing a similar version of the email to be displayed on a display device of the remote interface 1225).

At the termination of the contact (although other time and event triggers are possible) revenue, feedback, and training information may be generated. The CSA 205 may be credited $2, the user may be asked for feedback and (perhaps based on the feedback) the CSA 205 may be suggested to receive particular training.

The user may subsequently make another contact with the system 100', and the contact may be of a different type than before. Thus, for example, the user may contact the system via instant message. Here, the routing and distribution component 1220 may now make use of feedback and training information, provided by the respective components 1232 and 1233, to route the user's message to the same CSA 205 as who handled the first email.

FIG. 12 illustrates merely a few of the components that may be included in a system 100'. Many additional components may be included, such as controllers for different types of contacts, a CRM, a metrics service, and so forth. Moreover, the functionality attributed to each component as described herein may be transferred or shared to other components. The unit of work routed by the system, herein often described as a "call" or a "contact," need not be limited to communications. The system 100' is suitable for distributing units or objects that do not require communication between parties. So for example, the system 100' may distribute chores and tasks (such as print requests, research requests, audits, and physical build requests), followups, delayed interactions, and so forth. In such cases, the system 100' may provide advantages in providing a mechanism for maintaining and enforcing service level and quality expectations.

Metrics

As depicted in FIG. 1, the call controller service 102 (and other elements of the system 100) may utilize a metrics service 104 to both store and retrieve metrics regarding calls, customers, CSAs, and so forth. Such statistics may also be collected, analyzed, and/or displayed such that persons with appropriate permissions may be able to view them.

For display and classification purposes, metrics may be grouped into real-time statistics and historical statistics. This distinction may play a role in display formatting purposes. Real-time statistics are defined as those that have just a single data point, generally the "current" value. Historical statistics, on the other hand, have a set of values that range over time (e.g., minutes, half-hour intervals, days, or indefinitely). In many cases, real-time statistics reflect the current state of the system, e.g., the number of calls in queue, the number of CSAs available, etc. Some "real-time" statistics, however, do include historical information. The "current" SL, for example, may be displayed along with other real-time statistics, and in that context it may mean the service level for all calls (so far) in the current day (or some other fraction of calls which are used in the SL calculation).

The system 100, e.g., the CRM 101, may provide a CMS-based web page where people (who have the appropriate permission) may browse real-time data. Some embodiments may restrict the users who can view data for each agent node. For example, persons from a customer service department may have the ability to view real-time data for all agent nodes, while external agent nodes may only have access to view data corresponding to their own operations. Real-time metrics may be "rolled up" (combined and/or aggregated) in multiple ways, and reflect the appropriate combinations of locations, teams, and skills. Sample data is presented in FIG. 7, which shows real-time data organized by both location (top half, 701) and skill (bottom half, 702). These figures are only representative and could vary significantly without departing from the scope of the present disclosure. The metrics server (FIG. 1, 104) may also provide views of the data at various organization levels including: (1) the enterprise; (2) a given location; and/or (3) by teams. Each of these views (enterprise, location, team) may provide similar statistics broken out, e.g., by subgroup and/or by skill.

FIG. 8 provides a table of names and descriptions of some statistics that may be retained or reported by the metrics service 104. This table is not intended to be mandatory or exclusive. Additionally, some embodiments may keep and report detailed statistics regarding individual CSAs. Some of the information that might be kept or computing, and that may thereafter be selected for display to a user, include the following:

CSA Login:
The login or ID of the CSA.
CSA Name:
The first & last name of the CSA.
CSA Extension:
The CSA's extension or phone number.
Current State:
The current state of the CSA, potentially including the queue.
Time in State:
The amount of time the CSA has been in this state.
Blending Type:
The CSA's blending type, which may be one of the following: (1) oldest call; (2) drain queues in order; or (3) hybrid.
Skills:
A list of all skills the CSA can handle.

The metrics service 104 may also provide functionality to identify CSAs who have exceeded time thresholds in various states. This may be accomplished by, for example, highlighting CSAs who have exceeded some condition, emailing appropriate managers, etc. Some embodiments may implement this functionality in part by providing different thresholds for different CSA states or providing multiple thresholds (such as "warning" and "critical"). Some embodiments may vary the thresholds dynamically, such as by skill type, location or experience of the CSA, etc. Alternatively, a static, "one-size-fits-all" approach may be used.

Historical statistics may be generally calculated by accessing logs spanning a specified interval of time. Historical statistics may not reflect what is currently happening across the system 100. As with real-time data, different views of historical data may be presented to authorized users. Examples of criteria upon which to view historical data include, but are not limited to, service level, number of calls, CSA time spend in various states, call metrics such as average time, etc.

As shown in FIG. 9, views of historical data may include each of the following for both agent nodes 204 and individual CSAs: the number of calls taken 901, the average service level 902, the average hold time, the average talk time 903, the average time for other states (e.g., 904), and the average abandonment time 905 (i.e., average time at which customers "hang up" without being answered by a CSA), etc. Views may be sorted by agent node 906, day and time 907, or any other category. Categories may generally be expanded 908 where they consist of hierarchical information (such as CSAs belonging to an agent node). As shown in FIG. 10, some embodiments allow viewers to select individual CSAs (or other entries in other categories) to view more detailed results for that particular entity.

FIGS. 11A-11C depict an illustrative table of some statistics that may be calculated by the metrics service 104. This list is not exhaustive. The column header "Aggregation Types" 1101 refers to non-exhaustive categories under which a specific statistic may be aggregated or combined. "Skill Rollups" 1102 describes non-exhaustive skill groupings under which the given statistic may be aggregated. "Intervals Rollups"

1103 describes non-exhaustive, illustrative intervals under which statistics may be aggregated. It will be understood that the data in these columns has been limited for the sake of clarity. Those of skill in the art will recognize many non-expressed alternatives.

Metrics may be collected by the system and may output for use by, e.g., administrators. For example, abandonment rates for particular contacts may be used to detect and mitigate "cherry picking" of desirable or easy-to-answer contacts by a CSA. In some embodiments, if a contact is beyond the skill level of a particular CSA, the CSA may be compensated for adding attributes to the contact and/or causing it to be routed correctly.

Fault Tolerance

Some embodiments may be designed to be as robust in the face of unavailability of certain system components. For example, some embodiments may be designed to be tolerant to failures within and of the system 100 (and the underlying services that the system depends on, such as networking and proxy servers, for CSA availability information). If there are networking problems preventing CRM access, then a system without tolerance may not know which CSAs are available to take calls. Some embodiments may therefore include an IVR application that CSAs may call when they are unable to use the CRM system to let the system know they are available to take a customer call. The IVR application may be available whenever a CSA's phone system is able to make a call.

As another example, some embodiments may be designed to make the system 100 and its components as highly available as possible. Some embodiments may address this concern by, in part, designing the system 100 and components to be as simple as possible. This may minimize software issues that may be the most common cause of outages. In pursuing this design, there may be a short outage if there should ever be a hardware, software, or networking failure in the system. To address this, some embodiments may include a warm-standby system that will be able to take over if the primary system 100 should fail. Some embodiments may allow the warm standby to replace the primary system within a minute or two of failure. During this time, calls may be dropped. Alternatively and calls would not get dropped or cut off and customers would simply stay on hold a bit longer than normal while the system transitions to the backup.

Handling Network Outages

In some cases, there may be some cases in which the system 100 may choose not to handle any incoming calls. For example, if a key service is inaccessible and the system knows that CSAs will be unable to help customers, it may be advantageous to simply not handle incoming customer calls for a period of time until the service functionality is restored.

Some embodiments may provide a user interface where administrators may disconnect customers on hold (perhaps for a chosen skill) and prevent new customers from connecting. Some embodiments may, for each customer on hold for the chosen skill, play a media message, and then disconnect the customer. For each new customer that calls into a skill that is configured to not accept any calls, some embodiments may play a media message, and then disconnect the customer. In some embodiments, calls that are currently connected to CSAs handling this skill are not disconnected (perhaps because the CSA can simply hang up if needed). As a security and auditing precaution, the system 100 may send out email notifications to a specified email list whenever someone engages this functionality, potentially capturing both the login of the administrator who enabled this state, and a (administrator provided) reason for taking this action.

Turning Off Agent Nodes

Some embodiments provide the option of turning off an agent node 204, wherein no calls are routed to an agent node. Both the skill (or all skills) and agent node may be specified when taking this action. Alternatively, if there is one agent node experiencing problems, CSAs can simply be instructed to not request calls, and the system will then not route them any calls.

Turning off an agent node may prevent any calls from going into a node-specific queue, so they can be routed immediately to an agent node capable of accepting calls (without first being moved to a priority queue).

CONCLUSION

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for automatically distributing contacts, the system comprising:
  a data store configured to store profile information; and
  a computing device in communication with the data store, the computing device configured to execute:
    a pricing component that determines a price for processing an incoming contact;
    a contact distribution component that:
      routes an offer to process the incoming contact at the determined price to a first remote agent having a profile indicating the first remote agent's capability of processing the incoming contact;
      enables the first remote agent to accept or reject the offer to process the incoming contact at the determined price;
      routes the incoming contact to the first remote agent for processing if the first remote agent accepts the offer;
      routes the offer to process the incoming contact at the determined price to a second remote agent having a profile indicating the second remote agent's capability of processing the incoming contact if the first remote agent rejects the offer;

enables the second remote agent to accept or reject the offer to process the incoming contact at the determined price; and routes the incoming contact to the second remote agent if the second remote agent accepts the offer; and a revenue component that initiates payment of the price determined by the pricing component to the remote agent that accepts the offer and processes the incoming contact;

wherein the determined price is dependent at least in part on contact answering ability.

2. The system of claim 1, wherein the price is a fixed price or a variable price.

3. The system of claim 1, wherein the first and second remote agents belong to an agent node.

4. A computer-implemented method for automatically distributing contacts, the method comprising:

predetermining a price to pay a remote agent for processing an incoming contact;

identifying a first remote agent to process the incoming contact, wherein the first remote agent is associated with a profile that indicates that the first remote agent is capable of processing the incoming contact;

providing the first remote agent an offer to process the incoming contact at the predetermined price;

receiving an acceptance or rejection of the offer from the first remote agent;

routing the incoming contact to the first remote agent if the first remote agent accepts the offer;

identifying a second remote agent to process the incoming contact if the first remote agent rejects the offer, wherein the second remote agent is associated with a profile that indicates that the second remote agent is capable of processing the incoming contact;

providing the second remote agent the offer to process the incoming contact at the predetermined price;

receiving an acceptance or rejection of the offer from the second remote agent;

routing the incoming contact to the second remote agent if the second remote agent accepts the offer; and initiating payment of the predetermined price to the remote agent that accepts the offer and processes the incoming contact;

wherein the predetermined price is dependent at least in part on contact answering ability.

5. The computer-implemented method of claim 4, wherein the price is a fixed price or a variable price.

6. The computer-implemented method of claim 4, further comprising notifying an identified remote agent regarding the price.

7. The computer-implemented method of claim 6, wherein an identified remote agent is notified that the price has met or exceeded a threshold.

8. The computer-implemented method of claim 4, wherein the first and second remote agents belong to an agent node.

9. The computer-implemented method of claim 8, wherein the agent node includes one or more remote agents physically grouped together.

10. The computer-implemented method of claim 8, wherein the agent node includes one or more remote agents logically grouped together.

11. The computer-implemented method of claim 10, wherein the one or more remote agents are logically grouped together based at least in part by respective profiles of the remote agents.

12. The computer-implemented method of claim 4, further comprising gathering metrics related to the incoming contacts and a remote agent.

13. The computer-implemented method of claim 4, further comprising assigning incoming contacts to a routing queue associated with a centralized queue, wherein the routing queue is assigned to a remote agent.

14. The computer-implemented method of claim 4, further comprising associating feedback regarding the incoming contact with the remote agent that accepts the incoming contact.

15. The computer-implemented method of claim 4, further comprising determining a training regimen based at least in part upon the routing of the incoming contact to the remote agent that accepts the incoming contact.

16. The computer-implemented method of claim 4, wherein the incoming contact is at least one of a telephone call or electronic message.

17. A system for automatically distributing contacts, the system comprising:

a data store configured to store profile information; and a computing device in communication with the data store, the computing device configured to execute:

a pricing component that determines a predetermined price to pay a remote agent for processing an incoming contact; and a contact distribution component that:

directs an offer to process the incoming contact at the predetermined price to a first remote agent having a profile that indicates the first remote agent is capable of processing the incoming contact;

enables the first remote agent to accept or reject the offer to process the incoming contact at the predetermined price;

directs a rejected incoming contact to a second remote agent having a profile that indicates the second remote agent is capable of processing the incoming contact if the first remote agent rejects the offer;

directs the offer to process the incoming contact at the predetermined price to a second remote agent having a profile indicating the second remote agent is capable of processing the incoming contact if the first remote agent rejects the offer;

enables the second remote agent to accept or reject the offer to process the incoming contact at the predetermined price; and directs the incoming contact to the second remote agent if the second remote agent accepts the offer; and a revenue component that initiates payment of the price determined by the pricing component to the remote agent that accepts the offer and processes the incoming contact;

wherein the predetermined price is dependent at least in part on contact answering ability.

18. The system of claim 17, wherein the price is a fixed price or a variable price.

19. The system of claim 17, wherein the computing device is further configured to execute a revenue component that initiates payment of the price determined by the pricing component to the remote agent accepting the incoming contact.

20. The system of claim 17, wherein the first and second remote agents are in an agent node.

21. The system of claim 17, wherein the contact distribution component further:
   obtains feedback regarding contacts and agents; and
   directs the incoming contact based at least in part on the feedback.

22. The system of claim 17, wherein the contact distribution component further:
   obtains training information regarding remote agents; and
   directs the incoming contact to a remote agent based at least in part on training information obtained about the remote agent.

23. A non-transitory computer-readable medium having computer-executable components for automatically distributing contacts directly to remote agents capable of processing the contacts, the computer-executable components comprising:
   a pricing module that determines a predetermined price to pay a remote agent for processing an incoming contact;
   a contact distribution module that directs an offer to process the incoming contact at the predetermined price to a first remote agent having a profile associated with the first remote agent that indicates the first remote agent is capable of processing the incoming contact;
   a user interface module that enables the first remote agent to indicate the remote agent's desire to accept or reject the offer to process the incoming contact at the predetermined price;
   wherein the contact distribution module further routes the incoming contact to the first remote agent if the first remote agent accepts the offer and directs the offer to process the incoming contact at the predetermined price to a second remote agent having a profile associated with the second remote agent indicating the second remote agent's capability of processing the incoming contact if the first remote agent rejects the offer;
   wherein the user interface module further enables the second remote agent to indicate the second remote agent's desire to accept or reject the offer to process the incoming contact at the predetermined price;
   wherein the contact distribution module further routes the incoming contact to the second remote agent if the second remote agent accepts the offer; and
   a revenue module that initiates payment of the price predetermined by the pricing module to the remote agent that accepts the offer and processes the incoming contact;
   wherein the predetermined price is dependent at least in part on contact answering ability.

24. The non-transitory computer-readable medium of claim 23, wherein the price is fixed.

25. The non-transitory computer-readable medium of claim 23, wherein the price is variable.

26. The non-transitory computer-readable medium of claim 23, wherein the price is dependent on a contact answering ability of the remote agents capable of processing the incoming contact.

27. The non-transitory computer-readable medium of claim 23, wherein the determined price is dependent on information specific to the remote agent that accepts the incoming contact.

28. The non-transitory computer-readable medium of claim 23, further comprising a metric component that gathers metrics related to the incoming contacts and the remote agents.

29. The non-transitory computer-readable medium of claim 23 further comprising a feedback module operative to store feedback regarding contacts and agents, wherein the contact distribution module directs the incoming contact to a remote agent based at least in part on the feedback.

30. The non-transitory computer-readable medium of claim 23 further comprising a training module operative to store training information regarding remote agents, wherein the contact distribution module directs the incoming contact to a remote agent based at least in part on training information known about respective remote agents.

* * * * *